(12) United States Patent
Masuyama

(10) Patent No.: US 11,736,034 B2
(45) Date of Patent: Aug. 22, 2023

(54) POWER CONVERSION DEVICE

(71) Applicant: Mitsubishi Electric Corporation, Tokyo (JP)

(72) Inventor: Takahiro Masuyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 153 days.

(21) Appl. No.: 17/442,708

(22) PCT Filed: Apr. 1, 2019

(86) PCT No.: PCT/JP2019/014542
§ 371 (c)(1),
(2) Date: Sep. 24, 2021

(87) PCT Pub. No.: WO2020/202445
PCT Pub. Date: Oct. 8, 2020

(65) Prior Publication Data
US 2022/0149747 A1 May 12, 2022

(51) Int. Cl.
*H02M 7/483* (2007.01)
*H02M 7/00* (2006.01)
(Continued)

(52) U.S. Cl.
CPC ......... *H02M 7/4835* (2021.05); *H02M 7/003* (2013.01); *H02M 7/49* (2013.01); *H02M 7/493* (2013.01); *H02M 1/327* (2021.05)

(58) Field of Classification Search
CPC ........ H02M 7/003; H02M 7/48; H02M 7/483; H02M 7/4833; H02M 7/4835; H02M 7/487; H02M 7/49; H02M 7/493; H02M 7/538; H02M 7/64; H02M 1/32; H02M 1/322; H02M 1/325; H02M 1/327
See application file for complete search history.

(56) References Cited

U.S. PATENT DOCUMENTS 8,885,373 B1 * 11/2014 Valiani ................ H02M 1/32
363/71
2011/0133677 A1 * 6/2011 Franke ................ H02M 7/493
318/400.3
(Continued)

FOREIGN PATENT DOCUMENTS

| EP | 2842791 A2 | 3/2015 |
|---|---|---|
| JP | 2014096898 A | 5/2014 |
| JP | 2015046993 A | 3/2015 |

OTHER PUBLICATIONS

International Search Report (PCT/ISA/210) with translation and Written Opinion (PCT/ISA/237) dated Jun. 11, 2019, by the Japan Patent Office as the International Searching Authority for International Application No. PCT/JP2019/014542.

*Primary Examiner* — Thienvu V Tran
*Assistant Examiner* — Shahzeb K Ahmad
(74) *Attorney, Agent, or Firm* — Buchanan Ingersoll & Rooney PC

(57) ABSTRACT

A power conversion apparatus includes a base having a main surface to which switching elements of each of power converters are fixed, capacitor units, coupling members fixed to some of the capacitor units adjacent to each other, and fitting members fixed to the respective capacitor units and fixed to the base. The capacitor units are disposed along the main surface of the base.

19 Claims, 17 Drawing Sheets

(51) Int. Cl.
H02M 7/49 (2007.01)
H02M 7/493 (2007.01)
H02M 1/32 (2007.01)

(56) References Cited

U.S. PATENT DOCUMENTS

| | | | |
|---|---|---|---|
| 2013/0003299 A1* | 1/2013 | Wissner | H05K 7/14325 361/695 |
| 2019/0037697 A1* | 1/2019 | Miyasaka | H02M 1/44 |
| 2020/0328691 A1* | 10/2020 | Xing | H02M 7/483 |
| 2021/0003616 A1* | 1/2021 | Miwa | G01R 15/207 |

* cited by examiner

POWER CONVERSION DEVICE

TECHNICAL FIELD

The present disclosure relates to a power conversion apparatus.

BACKGROUND ART

Power conversion apparatuses, such as propulsion control apparatuses and power source apparatuses, installed in railway vehicles include capacitor units including large-capacity capacitors. An example of this type of power conversion apparatuses is disclosed in Patent Literature 1.

CITATION LIST

Patent Literature

Patent Literature 1: Unexamined Japanese Patent Application Publication No. 2015-46993

SUMMARY OF INVENTION

Technical Problem

A capacitor unit including large-capacity capacitors has a heavy weight. A power conversion apparatus equipped with multiple heavy capacitor units therefore require fixing frames to fix the respective capacitor units so as to be resistant to vibration. In the power conversion apparatus equipped with switching elements, the heavy capacitors are preferably disposed in the vicinity of the switching elements in order to satisfy the requirement for reducing the inductance from the switching elements to the capacitors. Unfortunately, if fixing frames for the respective capacitor units are fixed to a cooler base on which the switching elements are mounted, the fixing frames occupy the space for accommodating the switching elements, resulting in an increase in the size of the cooler base.

An objective of the present disclosure, which has been accomplished in view of the above situations, is to fix capacitor units so as to be resistant to vibration and ensure a sufficient space for accommodating the components of a power conversion apparatus.

Solution to Problem

In order to achieve the above objective, a power conversion apparatus according to an aspect of the present disclosure includes a plurality of capacitor units, a plurality of power converters, a base, at least one coupling member, and a plurality of fitting members. Each of the capacitor units includes at least one capacitor charged with electric power fed from a power source. Each of the power converters has primary terminals, secondary terminals, and switching elements. The primary terminals of the power converter are connected to a corresponding capacitor unit among the capacitor units. The power converter is configured to convert electric power fed via the primary terminals into electric power to be fed to a load connected to the secondary terminals by means of switching between on and off states of the switching elements and feed the converted electric power via the secondary terminals to the load. The base has a main surface to which the switching elements of each of the power converters are fixed. The at least one coupling member is fixed to some of the capacitor units adjacent to each other. Each of the fitting members is fixed to a corresponding capacitor unit among the capacitor units and fixed to the base. The capacitor units are disposed along the main surface of the base. The fitting members are fixed to capacitor units located on both sides among the capacitor units disposed along the main surface.

Advantageous Effects of Invention

According to an aspect of the present disclosure, the at least one coupling member is fixed to some of the capacitor units adjacent to each other, the fitting members are fixed to the capacitor units located on both sides among the capacitor units disposed along the main surface, and the fitting members are also fixed to the base. This structure can fix the capacitor units so as to be resistant to vibration and can ensure a sufficient space for accommodating the components of the power conversion apparatus.

DESCRIPTION OF EMBODIMENTS

Figure 1:
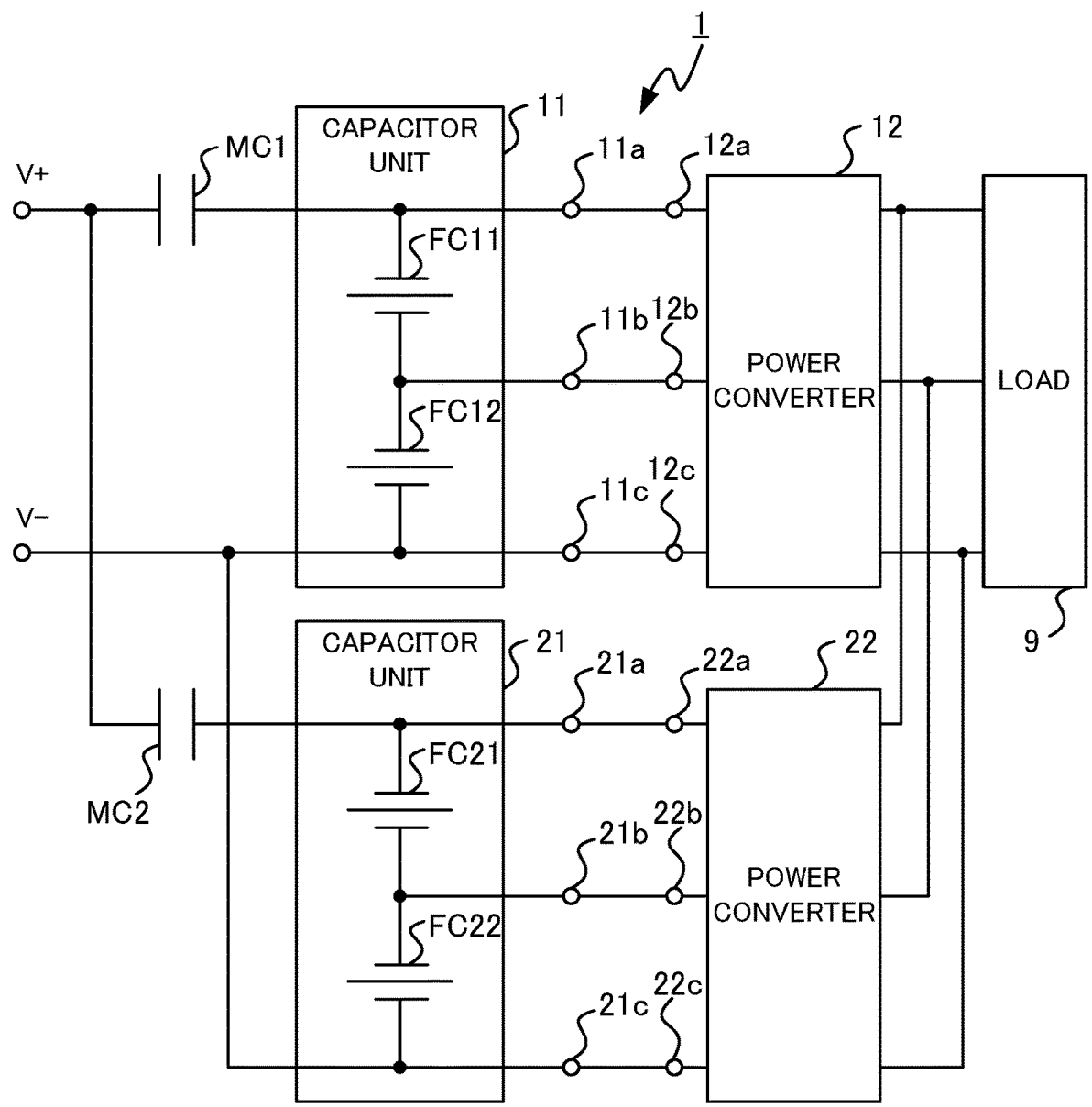
FIG. 1 is a circuit diagram of a power conversion apparatus according to Embodiment 1 of the present disclosure.

A power conversion apparatus according to embodiments of the present disclosure is described in detail below with reference to the accompanying drawings. In the drawings, the components identical or corresponding to each other are provided with the same reference symbol.

Embodiment 1

An example of power conversion apparatuses installed in railway vehicles is a power conversion apparatus that converts direct current (DC) power fed from a DC power source into three-phase alternating current (AC) power and feeds the power to a motor. A power conversion apparatus according to Embodiment 1 is described below focusing on an exemplary power conversion apparatus of a dual system, including two power converters one of which is set as an operation system and the other of which is set as a standby system. A power conversion apparatus 1 is fed with DC power acquired by a current collector, which is not shown and corresponds to a power source, from a substation via an overhead wire. The power conversion apparatus 1 converts the fed DC power into three-phase AC power and feeds the power to a load 9. The load 9 includes a three-phase induction motor, for example.

A circuit configuration of the power conversion apparatus 1 is described below focusing on an example in which the power conversion apparatus 1 includes a three-level inverter. As illustrated in FIG. 1, the power conversion apparatus 1 includes power converters 12 and 22 to convert DC power fed via primary terminals into three-phase AC power and output the three-phase AC power via secondary terminals, a capacitor unit 11 connected to the primary terminals of the power converter 12, and a capacitor unit 21 connected to the primary terminals of the power converter 22.

The power conversion apparatus 1 is further equipped with a contactor MC1 and a contactor MC2. The contactor MC1 has one end connected to the current collector and the other end connected to the capacitor unit 11. The contactor MC1 electrically connects the power converter 12 to the current collector or electrically disconnects the power converter 12 from the current collector. The contactor MC2 has one end connected to the current collector and the other end connected to the capacitor unit 21. The contactor MC2 electrically connects the power converter 22 to the current collector or electrically disconnects the power converter 22 from the current collector.

The power converter 12 includes the primary terminals including a positive-electrode terminal 12a, a middle terminal 12b, and a negative-electrode terminal 12c. The power converter 12 also includes a plurality of switching elements. The switching elements shift between on and off states under the control of a switching controller, which is not shown. The shift between the on and off states of the switching elements enables the power converter 12 to convert DC power fed via the primary terminals into three-phase AC power and outputs the three-phase AC power via the secondary terminals to the load 9.

The power converter 22 has the primary terminals including a positive-electrode terminal 22a, a middle terminal 22b, and a negative-electrode terminal 22c. The power converter 22 also has a plurality of switching elements. The switching elements are controlled by the switching controller, which is not shown, so that the power converter 22 converts DC power fed via the primary terminals into three-phase AC power and outputs the three-phase AC power via the secondary terminals to the load 9.

One of the power converters 12 and 22 is set as an operation system while the other is set as a standby system. The following description assumes that the power converter 12 is set as an operation system. The secondary terminals of the power converters 12 and 22 are electrically connected to the common load 9.

The capacitor unit 11 includes filter capacitors FC11 and FC12 connected in series. The filter capacitors FC11 and FC12 are charged with electric power fed from the current collector. The capacitor unit 11 also has output terminals 11a, 11b, and 11c. The output terminal 11a is electrically connected to one end of the filter capacitor FC11. The output terminal 11b is electrically connected to a connection point between the other end of the filter capacitor FC11 and one end of the filter capacitor FC12. The output terminal 11c is electrically connected to the other end of the filter capacitor FC12.

The capacitor unit 21 includes filter capacitors FC21 and FC22 connected in series. The filter capacitors FC21 and FC22 are charged with electric power fed from the current collector. The capacitor unit 21 also has output terminals 21a, 21b, and 21c. The output terminal 21a is electrically connected to one end of the filter capacitor FC21. The output terminal 21b is electrically connected to a connection point between the other end of the filter capacitor FC21 and one end of the filter capacitor FC22. The output terminal 21c is electrically connected to the other end of the filter capacitor FC22.

The output terminals 11a, 11b, and 11c are electrically connected to the positive-electrode terminal 12a, the middle terminal 12b, and the negative-electrode terminal 12c, respectively. The output terminals 21a, 21b, and 21c are electrically connected to the positive-electrode terminal 22a, the middle terminal 22b, and the negative-electrode terminal 22c, respectively.

The contactors MC1 and MC2 include DC electromagnetic contactors. The contactors MC1 and MC2 are controlled by a contactor controller, which is not shown, such that one of the contactors MC1 and MC2 is closed during operation of the power conversion apparatus 1.

During operation of the power conversion apparatus 1 having the above-described configuration, the switching elements of the power converter 12, which is set as an operation system, repeat on-off operations. In the case of failure in the power converter 12, the power converter 22, which has been set as a standby system, is set as an operation system, and the switching elements of the power converter 22 then start on-off operations. The switching elements generate heat because of repetition of the on-off operations. The switching elements of the power converters 12 and 22 are fixed to a base provided with a heat sink for cooling of the switching elements of the power converters 12 and 22. In addition, the capacitor units 11 and 21 are fixed to the base at positions adjacent to the switching elements so as to prevent increases in parasitic inductance and parasitic impedance. The capacitor units 11 and 21 are to be fixed to the base so as to be resistant to vibration of the railway vehicle.

Figure 2:
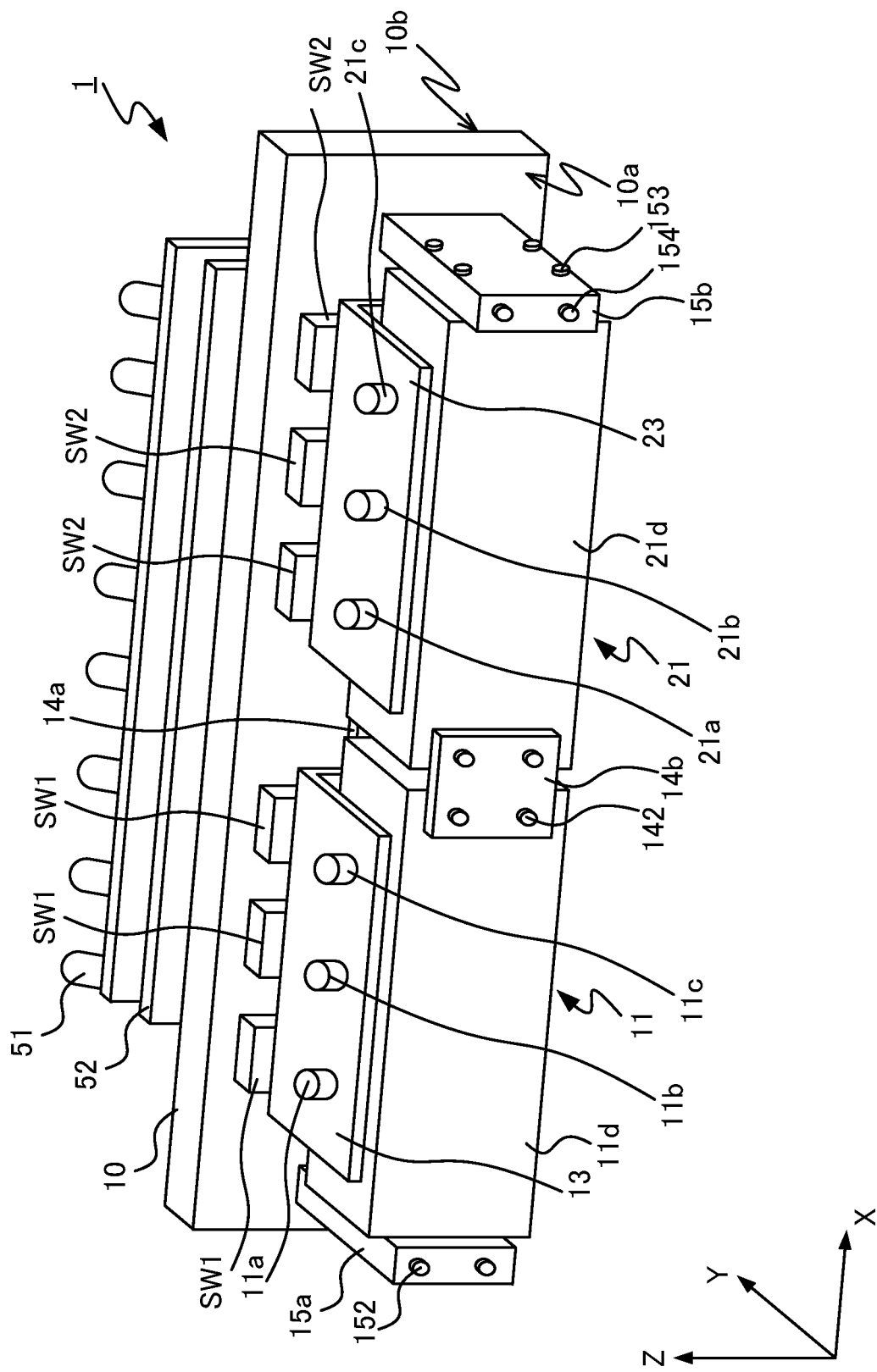
FIG. 2 is a perspective view of the power conversion apparatus according to Embodiment 1.
Figure 3:
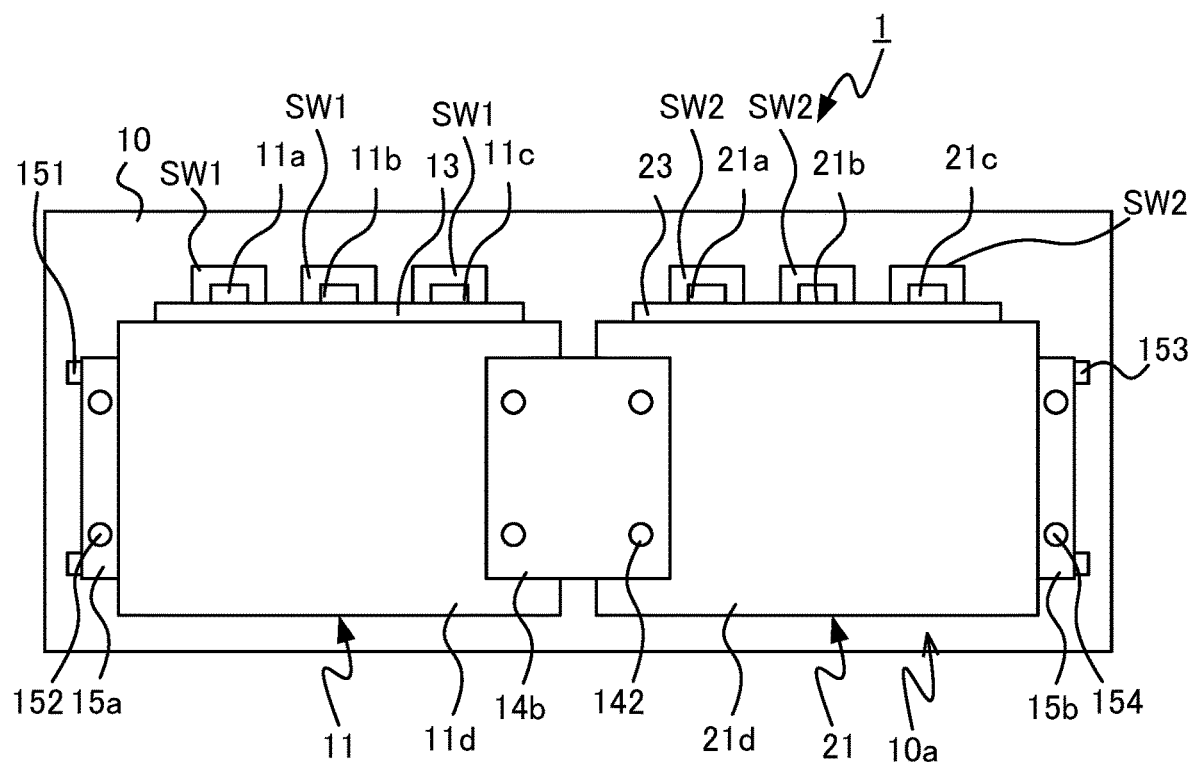
FIG. 3 is a front view of the power conversion apparatus according to Embodiment 1.
Figure 4:
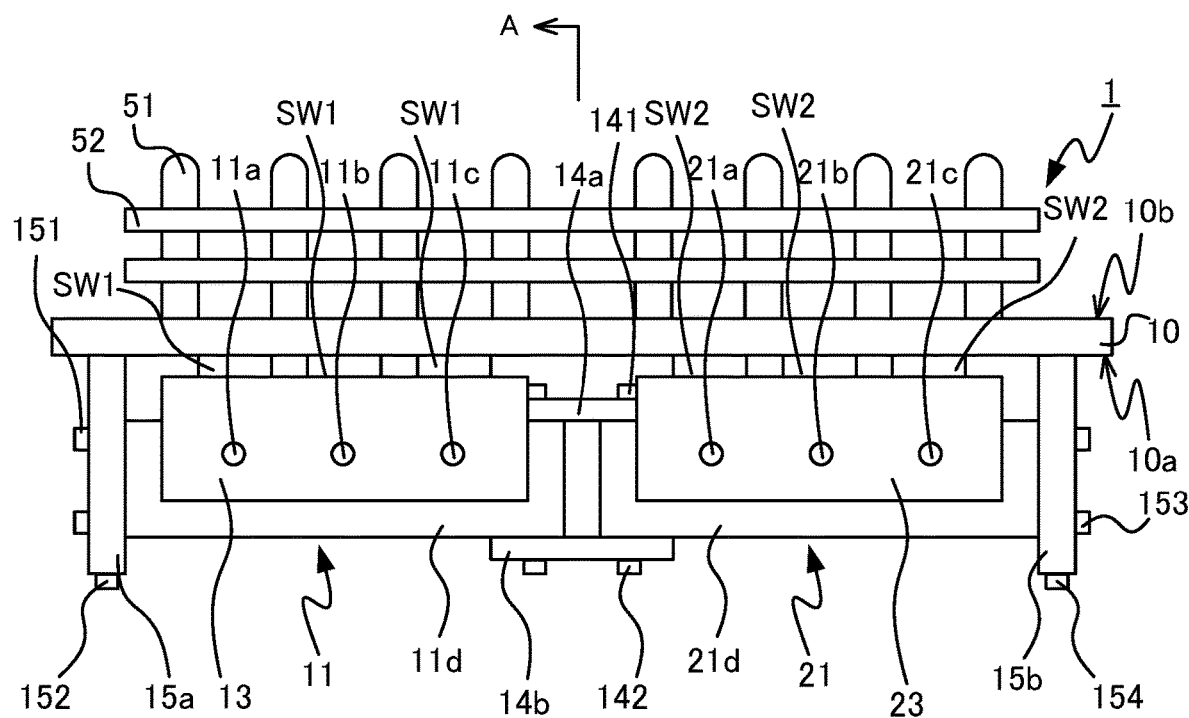
FIG. 4 is a top view of the power conversion apparatus according to Embodiment 1.
Figure 5:
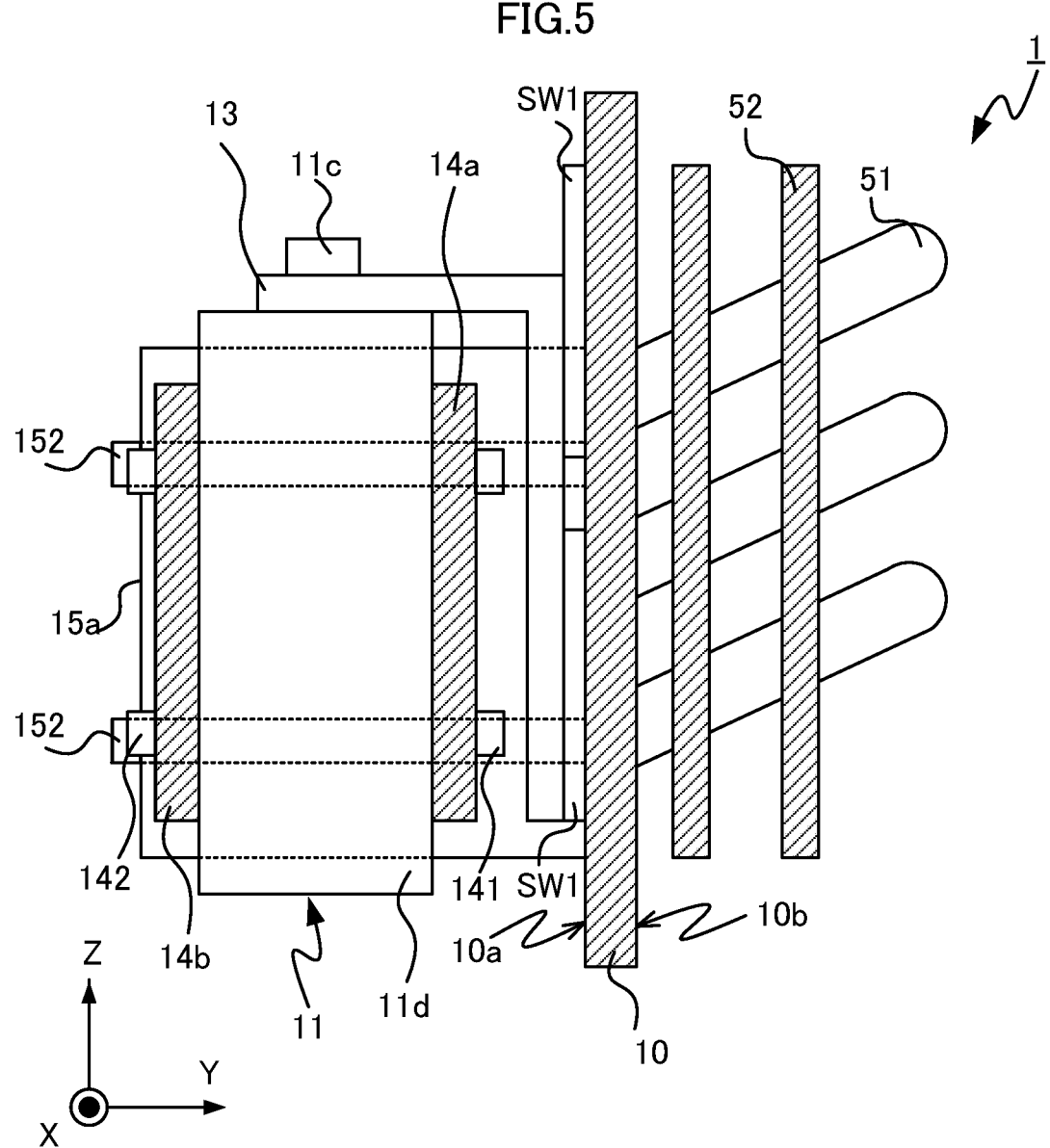
FIG. 5 is a cross-sectional view of the power conversion apparatus according to Embodiment 1 taken along the line A-A of FIG. 4.

A structure of the power conversion apparatus 1 for fixing the capacitor units 11 and 21 to the base so as to be resistant to vibration of the railway vehicle is described below with reference to FIGS. 2 to 5. FIGS. 2 to 5 do not illustrate the contactor MC1 or MC2 in FIG. 1 or the components of the power converters 12 and 22 other than switching elements SW1 and SW2, in order to simplify the figure. FIG. 2 is a perspective view of the power conversion apparatus 1, FIG. 3 is a front view of the power conversion apparatus 1, FIG. 4 is a top view of the power conversion apparatus 1, and FIG. 5 is a cross-sectional view taken along the line A-A of FIG. 4. In FIGS. 2 to 5, the Z axis indicates the vertical direction, the X axis extends along a main surface 10a of a cooler base 10 (hereinafter referred to as "base 10"), and the Y axis extends along the direction orthogonal to the main surface 10a of the base 10 and is orthogonal to the X and Z axes.

The base 10 is provided with a plurality of heat pipes 51 fixed to a main surface 10b of the base 10. Fins 52 are fixed to the heat pipes 51 such that the heat pipes 51 extend through the fins 52. The fins 52 cause heat transferred via the heat pipes 51 from the switching elements SW1 and SW2 fixed to the main surface 10a as described below, to be discharged to the air. This heat discharge cools the switching elements SW1 and SW2.

The capacitor unit 11 includes the filter capacitors FC11 and FC12 in FIG. 1, a housing 11d that accommodates the filter capacitors FC11 and FC12, and the output terminals 11a, 11b, and 11c. Specifically, the output terminals 11a, 11b, and 11c are disposed on the upper surface of the housing 11d.

Also, the capacitor unit 21 includes the filter capacitors FC21 and FC22, a housing 21d that accommodates the filter capacitors FC21 and FC22, and the output terminals 21a, 21b, and 21c. Specifically, the output terminals 21a, 21b, and 21c are disposed on the upper surface of the housing 21d.

The capacitor units 11 and 21 are adjacent to each other in the X-axis direction.

The switching elements SW1 of the power converter 12 and the switching elements SW2 of the power converter 22 are both fixed to the main surface 10a of the base 10.

The power conversion apparatus 1 is further equipped with a bus bar 13 to connect the respective output terminals 11a, 11b, and 11c to the corresponding switching elements SW1, and a bus bar 23 to connect the respective output terminals 21a, 21b, and 21c to the corresponding switching elements SW2. The bus bars 13 and 23 include laminated bus bars, for example.

Specifically, the bus bar 13 electrically connects the output terminal 11a to one of the switching elements SW1 leading to the positive-electrode terminal 12a, electrically connects the output terminal 11b to one of the switching elements SW1 leading to the middle terminal 12b, and electrically connects the output terminal 11c to one of the switching elements SW1 leading to the negative-electrode terminal 12c.

The bus bar 23 electrically connects the output terminal 21a to one of the switching elements SW2 leading to the positive-electrode terminal 22a, electrically connects the output terminal 21b to one of the switching elements SW2 leading to the middle terminal 22b, and electrically connects the output terminal 21c to one of the switching elements SW2 leading to the negative-electrode terminal 22c.

Each of the bus bars 13 and 23 includes a laminated bus bar fabricated by stacking conductors and insulators.

In order to fix the capacitor units 11 and 21 to the base 10 so as to be resistant to vibration of the railway vehicle, the power conversion apparatus 1 is further equipped with at least one coupling member fixed to the capacitor units 11 and 21, and fitting members 15a and 15b to fix the capacitor units 11 and 21 to the main surface 10a of the base 10.

In Embodiment 1, at least one coupling member includes a pair of first coupling members 14a and 14b that extend in the X-axis and Z-axis directions and face each other with a space therebetween in a direction intersecting the main surface 10a of the base 10. Specifically, the pair of first coupling members 14a and 14b extend in the X-axis and Z-axis directions and face each other with a space therebetween in the Y-axis direction. The pair of first coupling members 14a and 14b are fixed to the housing 11d of the capacitor unit 11 and the housing 21d of the capacitor unit 21 by fasteners 141 and 142, while retaining the capacitor units 11 and 21 between the first coupling members 14a and 14b in the Y-axis direction.

In detail, the first coupling member 14a is fixed to the housings 11d and 21d by the four fasteners 141, while being in contact with the respective surfaces of the housings 11d and 21d that face the main surface 10a. The first coupling member 14b is fixed to the housings 11d and 21d by the four fasteners 142, while being in contact with the respective surfaces of the housings 11d and 21d opposite to the surfaces that face the main surface 10a. The first coupling member 14a presses the housings 11d and 21d in the negative Y-axis direction. The first coupling member 14b presses the housings 11d and 21d in the positive Y-axis direction.

The first coupling members 14a and 14b are not fixed to the main surface 10a.

The fitting member 15a is fixed to the capacitor unit 11 and fixed to the main surface 10a of the base 10. Specifically, the fitting member 15a is fixed to the housing 11d by fasteners 151, while being in contact with the side surface of the housing 11d opposite to the side surface that faces the housing 21d. The fitting member 15a is also fixed to the main surface 10a by fasteners 152 while being in contact with the main surface 10a.

The fitting member 15b is fixed to the capacitor unit 21 and fixed to the main surface 10a of the base 10. Specifically, the fitting member 15b is fixed to the housing 21d by fasteners 153, while being in contact with the side surface of the housing 21d opposite to the side surface that faces the housing 11d. The fitting member 15b is also fixed to the base 10 by fasteners 154 while being in contact with the main surface 10a.

Each of the first coupling members 14a and 14b and the fitting members 15a and 15b is made of a plate member. The fitting members 15a and 15b preferably have a box shape having an opening on one surface, which is formed by bending a plate member. In this case, the fitting member 15a may be fixed to the main surface 10a of the base 10 such that the opening faces in the negative X-axis direction, and the fitting member 15b may be fixed to the main surface 10a of the base 10 such that the opening faces in the positive X-axis direction, for example. The first coupling members 14a and 14b and the fitting members 15a and 15b are made of members having sufficient rigidity and strength to at least maintain the positions of the capacitor units 11 and 21 regardless of the maximum expected vibration of the railway vehicle.

As described above, the capacitor units 11 and 21 are fixed to the base 10 by the fitting members 15a and 15b in the power conversion apparatus 1 according to Embodiment 1. Furthermore, the pair of first coupling members 14a and 14b are fixed to the capacitor units 11 and 21. The capacitor units 11 and 21 are therefore fixed without displacement, regardless of the maximum expected vibration of the railway vehicle.

The pair of first coupling members 14a and 14b are not fixed to the main surface 10a of the base 10. This structure can ensure a larger space for accommodating the components of the power conversion apparatus 1 in comparison to the structure in which fitting frames provided to both ends of each of the capacitor units 11 and 21 in the X-axis direction are fixed to the base 10. Specifically, arrangement of the switching elements SW1 and SW2 on the main surface 10a of the base 10 is less limited in the power conversion apparatus 1. This advantage allows the switching elements SW1 and SW2 to be placed closer to each other, leading to a reduction in the size of the power conversion apparatus 1.

Embodiment 2

The number of capacitor units is not necessarily two, and the direction of arrangement of the capacitor units is not necessarily only the X-axis direction. Embodiment 2 is directed to an exemplary structure in which four capacitor units are arranged in a two-dimensional manner in the X-axis and Y-axis directions.

Figure 6:
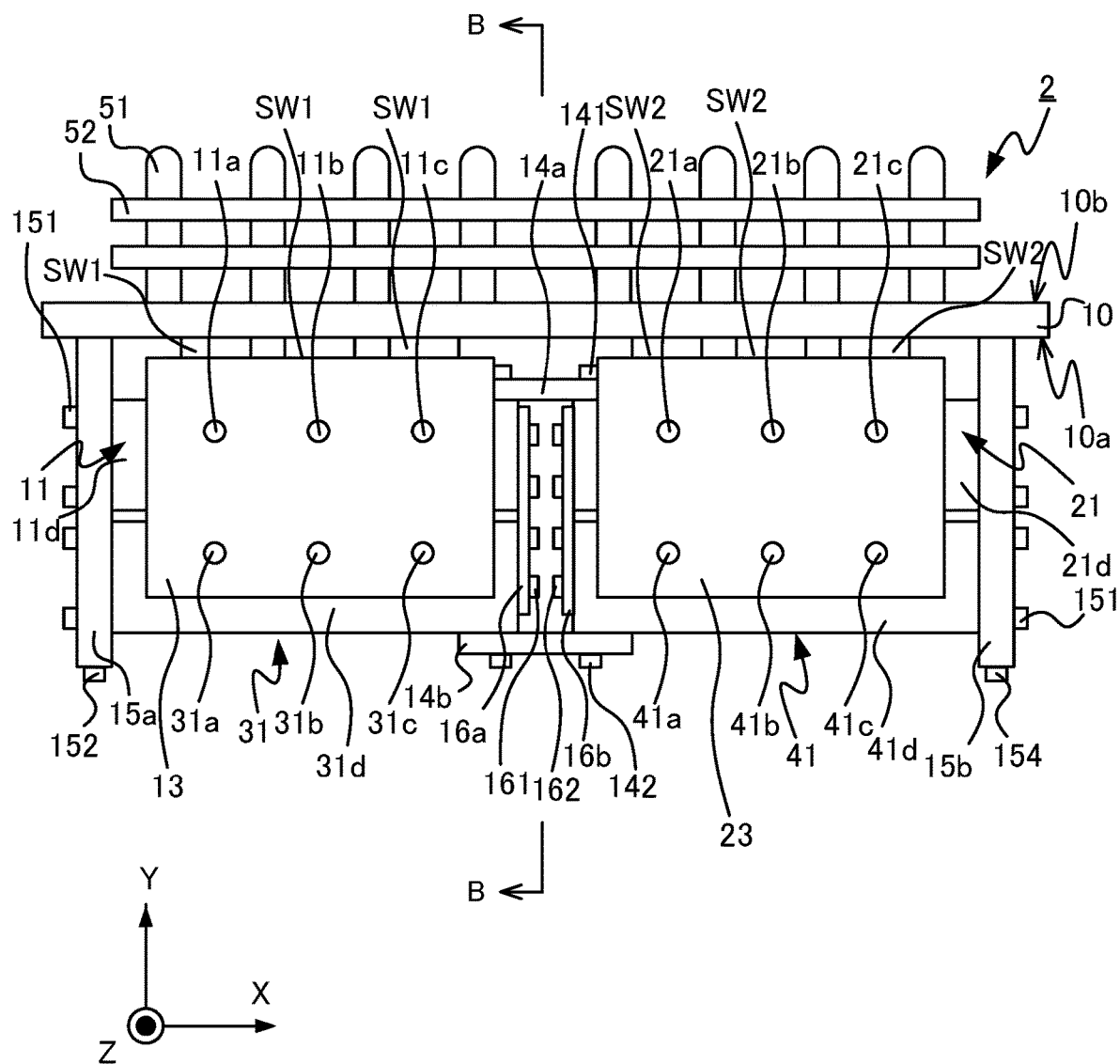
FIG. 6 is a top view of a power conversion apparatus according to Embodiment 2 of the present disclosure.
Figure 7:
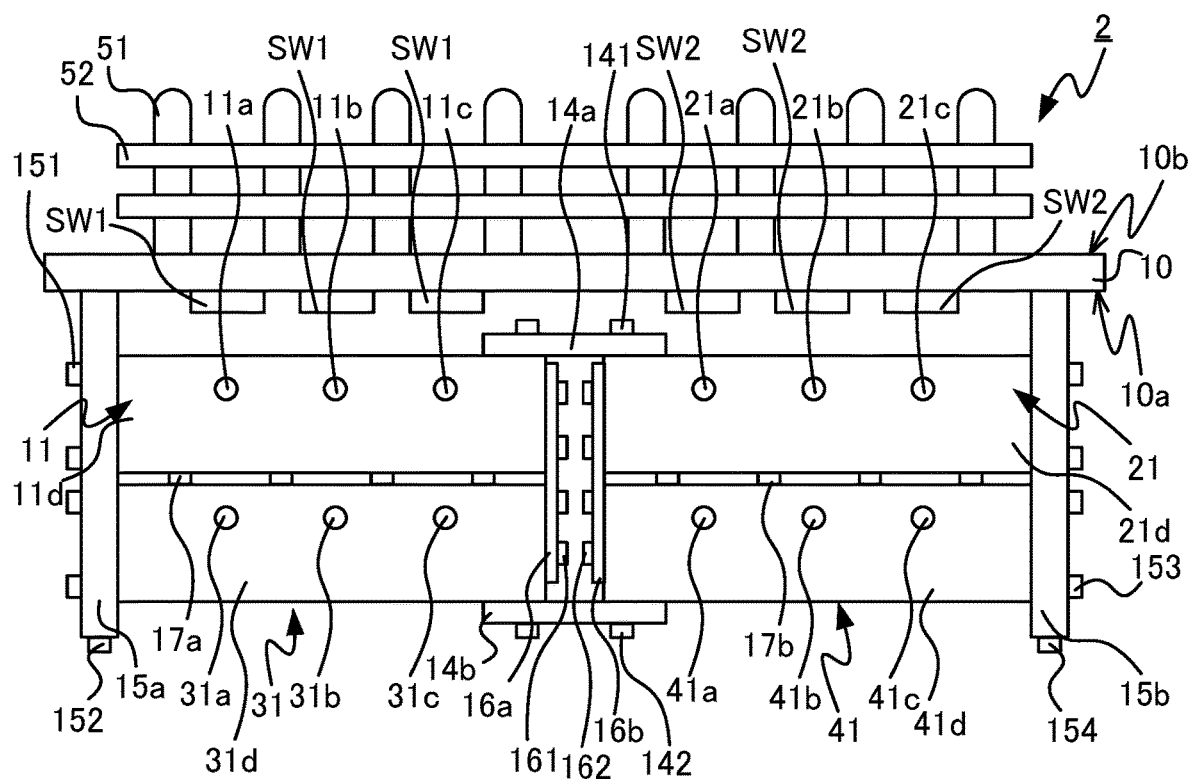
FIG. 7 is a top view of the power conversion apparatus according to Embodiment 2.
Figure 7:
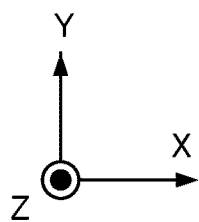
Figure 8:
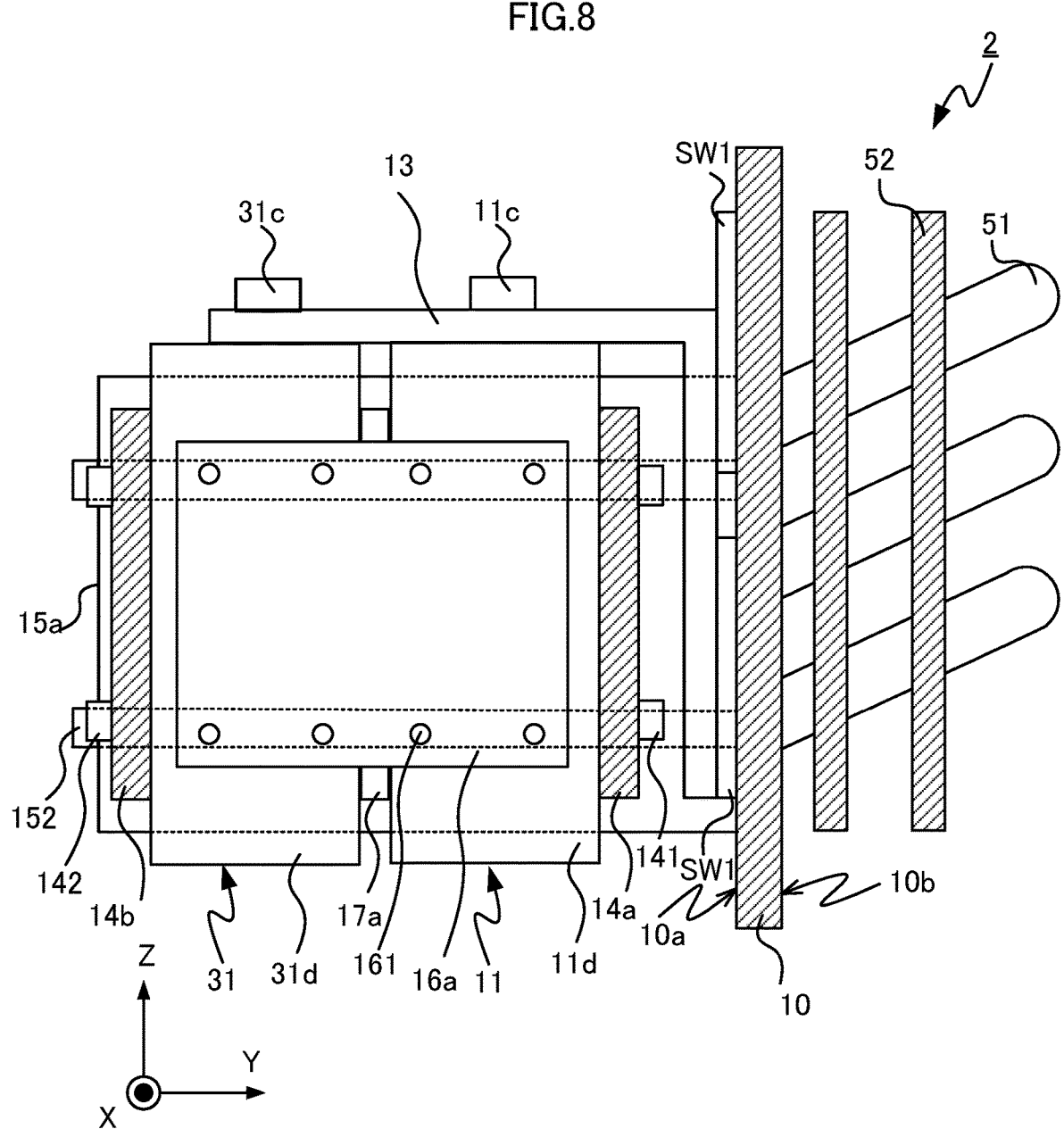
FIG. 8 is a cross-sectional view of the power conversion apparatus according to Embodiment 2 taken along the line B-B of FIG. 6.

As illustrated in FIGS. 6 to 8, a power conversion apparatus 2 according to Embodiment 2 includes capacitor units 11, 21, 31, and 41. FIGS. 6 and 7 are top views of the power conversion apparatus 2, and FIG. 8 is a cross-sectional view taken along the line B-B of FIG. 6. FIGS. 6 to 8 do not illustrate the contactor MC1 or MC2 in FIG. 1 or the components of the power converters 12 and 22 other than the switching elements SW1 and SW2, in order to simplify the figure. FIG. 7 is formed by removing the bus bars 13 and 23 from the top view of the power conversion apparatus 2 in FIG. 6.

As illustrated in FIGS. 6 to 8, the capacitor units 11, 21, 31, and 41 are arranged in a two-dimensional manner in the X-axis and Y-axis directions. Specifically, the capacitor units 11 and 21 are adjacent to each other in the X-axis direction. The capacitor units 11 and 31 are adjacent to each other in the Y-axis direction. The capacitor units 21 and 41 are adjacent to each other in the Y-axis direction.

The capacitor units 31 and 41 have the structure identical to that of the capacitor units 11 and 21. Specifically, the capacitor unit 31 includes filter capacitors, a housing 31d to accommodate the filter capacitors, and output terminals 31a, 31b, and 31c. More specifically, the output terminals 31a, 31b, and 31c are disposed on the upper surface of the housing 31d. The output terminals 31a, 31b, and 31c are electrically connected to the positive-electrode terminal 12a, the middle terminal 12b, and the negative-electrode terminal 12c in FIG. 1, respectively.

The capacitor unit 41 illustrated in FIGS. 6 to 8 includes filter capacitors, a housing 41d to accommodate the filter capacitors, and output terminals 41a, 41b, and 41c. Specifically, the output terminals 41a, 41b, and 41c are disposed on the upper surface of the housing 41d. The output terminals 41a, 41b, and 41c are electrically connected to the positive-electrode terminal 22a, the middle terminal 22b, and the negative-electrode terminal 22c in FIG. 1, respectively.

A structure of the power conversion apparatus 2 for fixing the capacitor units 11, 21, 31, and 41 to the base 10 is described below with reference to FIGS. 6 to 8, mainly focusing on the differences from Embodiment 1. At least one coupling member in the power conversion apparatus 2 includes the pair of first coupling members 14a and 14b that extend in the X-axis and Z-axis directions and face each other with a space therebetween in the direction intersecting the main surface 10a of the base 10, and a plurality of second coupling members 16a and 16b that extend in the direction intersecting the main surface 10a of the base 10. The power conversion apparatus 2 is further equipped with spacers 17a in contact with the capacitor units 11 and 31 and spacers 17b in contact with the capacitor units 21 and 41, in addition to the components of the power conversion apparatus 1.

The bus bar 13 connects the respective output terminals 11a, 11b, and 11c to the corresponding switching elements SW1, and connects the respective output terminals 31a, 31b, and 31c to the corresponding switching elements SW1. The bus bar 23 connects the respective output terminals 21a, 21b, and 21c to the corresponding switching elements SW2, and connects the respective output terminals 41a, 41b, and 41c to the corresponding switching elements SW2.

The pair of first coupling members 14a and 14b extend in the X-axis and Z-axis directions and face each other with a space therebetween in the Y-axis direction. The pair of first coupling members 14a and 14b are fixed to the housings 11d, 21d, 31d, and 41d of the capacitor units 11, 21, 31, and 41 by the fasteners 141 and 142, while retaining the capacitor unit 11, the spacers 17a, and the capacitor unit 31 between the first coupling members 14a and 14b in the Y-axis direction and retaining the capacitor unit 21, the spacers 17b, and the capacitor unit 41 between the first coupling members 14a and 14b in the Y-axis direction.

In detail, the first coupling member 14a is fixed to the housings 11d and 21d by the four fasteners 141, while being in contact with the respective surfaces of the housings 11d and 21d that face the main surface 10a. The first coupling member 14b is fixed to the housings 31d and 41d by the four fasteners 142, while being in contact with the respective surfaces of the housings 31d and 41d opposite to the surfaces that face the main surface 10a. The first coupling member 14a presses the housings 11d and 21d in the negative Y-axis direction, and the first coupling member 14b presses the housings 31d and 41d in the positive Y-axis direction.

The first coupling members 14a and 14b are not fixed to the main surface 10a.

Each of the second coupling members 16a and 16b extends in the Y-axis and Z-axis directions. The second coupling member 16a is fixed to the housing 11d of the capacitor unit 11 and the housing 31d of the capacitor unit 31 by fasteners 161. In detail, the second coupling member 16a is fixed to the housing 11d by the four fasteners 161 and to the housing 31d by the four fasteners 161, while being in contact with the respective surfaces of the housings 11d and 31d opposite to the surfaces that face the fitting member 15a. The second coupling member 16a presses the housings 11d and 31d toward the fitting member 15a.

The second coupling member 16b is fixed to the housing 21d of the capacitor unit 21 and the housing 41d of the capacitor unit 41 by fasteners 162. In detail, the second coupling member 16b is fixed to the housing 21d by the four fasteners 162 and to the housing 41d by the four fasteners 162, while being in contact with the respective surfaces of the housings 21d and 41d opposite to the surfaces that face the fitting member 15b. The second coupling member 16b presses the housings 21d and 41d toward the fitting member 15b. Each of the second coupling members 16a and 16b is made of a plate member.

The spacers 17a ensure the space between the housings 11d and 31d. The spacers 17a are in contact with the housings 11d and 31d and extend in the Z-axis direction.

The spacers 17b ensure the space between the housings 21d and 41d. The spacers 17b are in contact with the housings 21d and 41d and extend in the Z-axis direction.

The first coupling members 14a and 14b, the fitting members 15a and 15b, the second coupling members 16a and 16b, and the spacers 17a and 17b are made of members having sufficient rigidity and strength to at least maintain the positions of the capacitor units 11, 21, 31, and 41, regardless of the maximum expected vibration of the railway vehicle.

As described above, the capacitor units 11, 21, 31, and 41 are fixed to the base 10 by the fitting members 15a and 15b in the power conversion apparatus 2 according to Embodiment 2. Furthermore, the pair of first coupling members 14a and 14b and the second coupling members 16a and 16b are fixed to the capacitor units 11, 21, 31, and 41. The capacitor units 11, 21, 31, and 41 are therefore fixed without displacement, regardless of the maximum expected vibration of the railway vehicle.

The pair of first coupling members 14a and 14b are not fixed to the main surface 10a of the base 10. Also, the second coupling members 16a and 16b are not fixed to the main surface 10a of the base 10. This structure can ensure a larger space for accommodating the components of the power conversion apparatus 2, in comparison to the structure in which fitting frames provided to both ends of each of the capacitor units 11, 21, 31, and 41 in the X-axis direction are fixed to the base. Specifically, arrangement of the switching elements SW1 and SW2 on the main surface 10a of the base 10 is less limited in the power conversion apparatus 2. This advantage allows the switching elements SW1 and SW2 to be placed closer to each other, leading to a reduction in the size of the power conversion apparatus 2.

Embodiment 3

The power conversion apparatus 2 may have any structure for fixing the capacitor units 11, 21, 31, and 41 to the base 10 provided that the structure can fix the capacitor units 11, 21, 31, and 41 without displacement regardless of the maximum expected vibration of the railway vehicle. Embodiment 3 is directed to an exemplary structure including two pairs of first coupling members.

Figure 9:
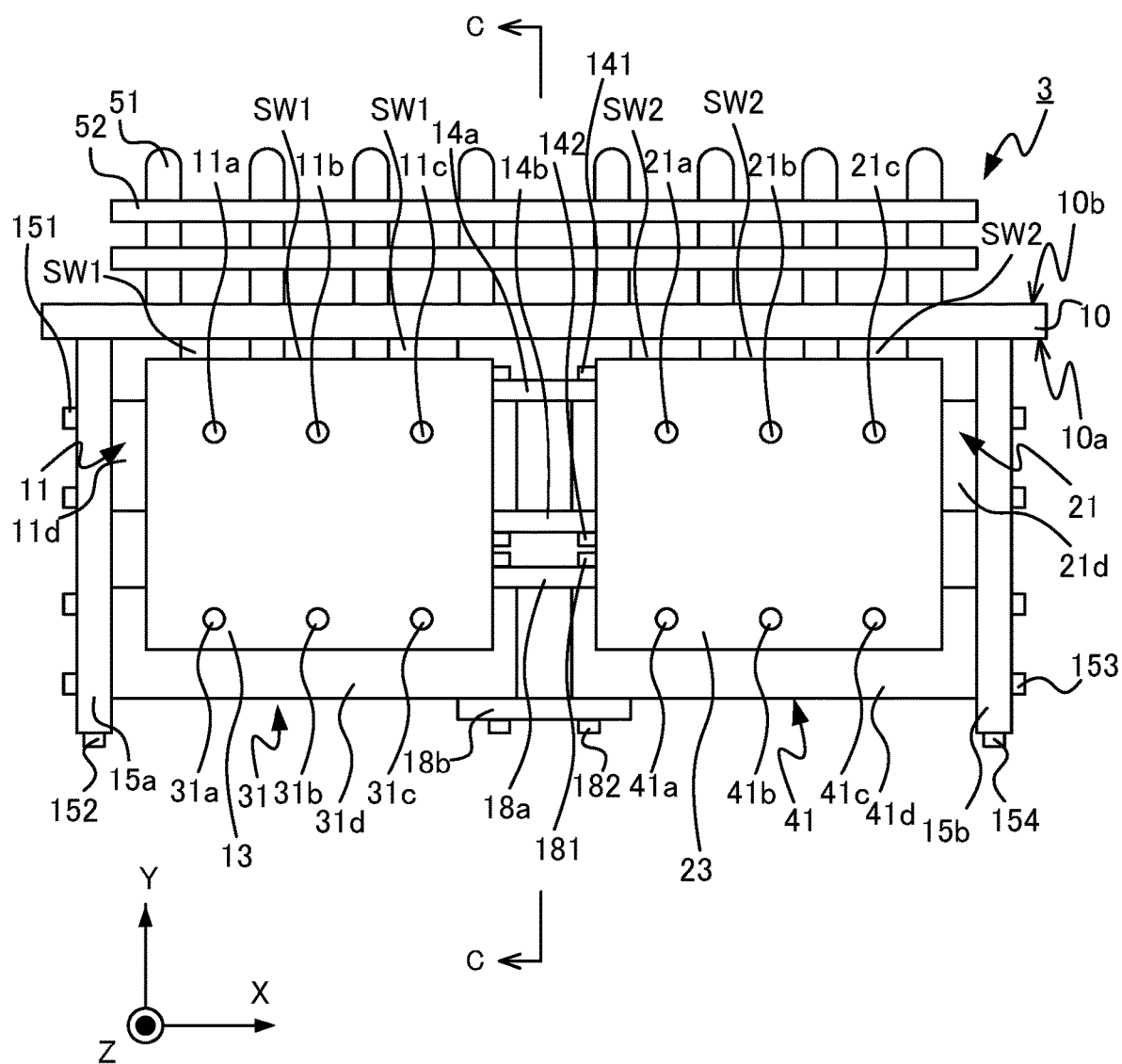
FIG. 9 is a top view of a power conversion apparatus according to Embodiment 3 of the present disclosure.
Figure 10:
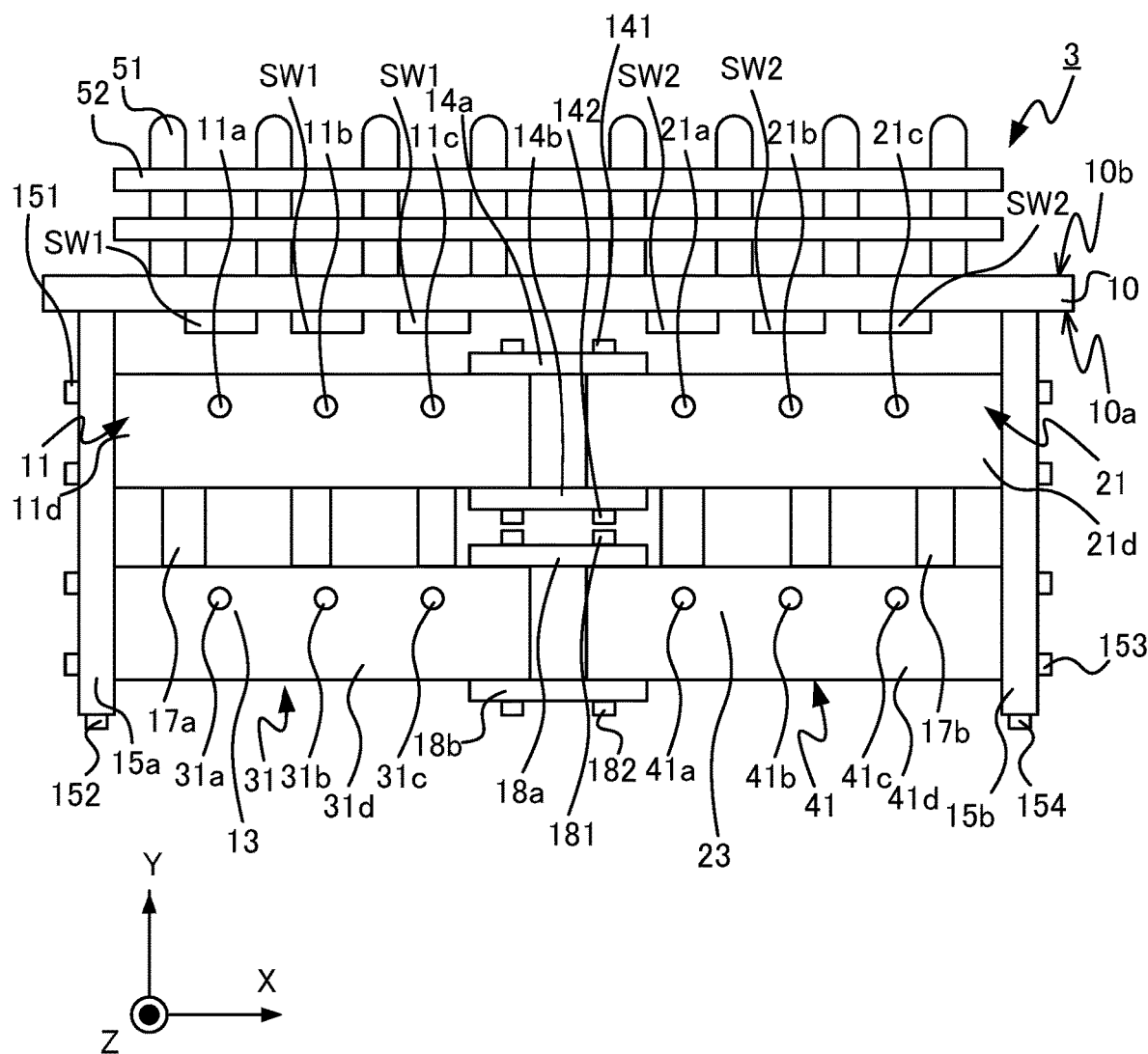
FIG. 10 is a top view of the power conversion apparatus according to Embodiment 3.
Figure 11:
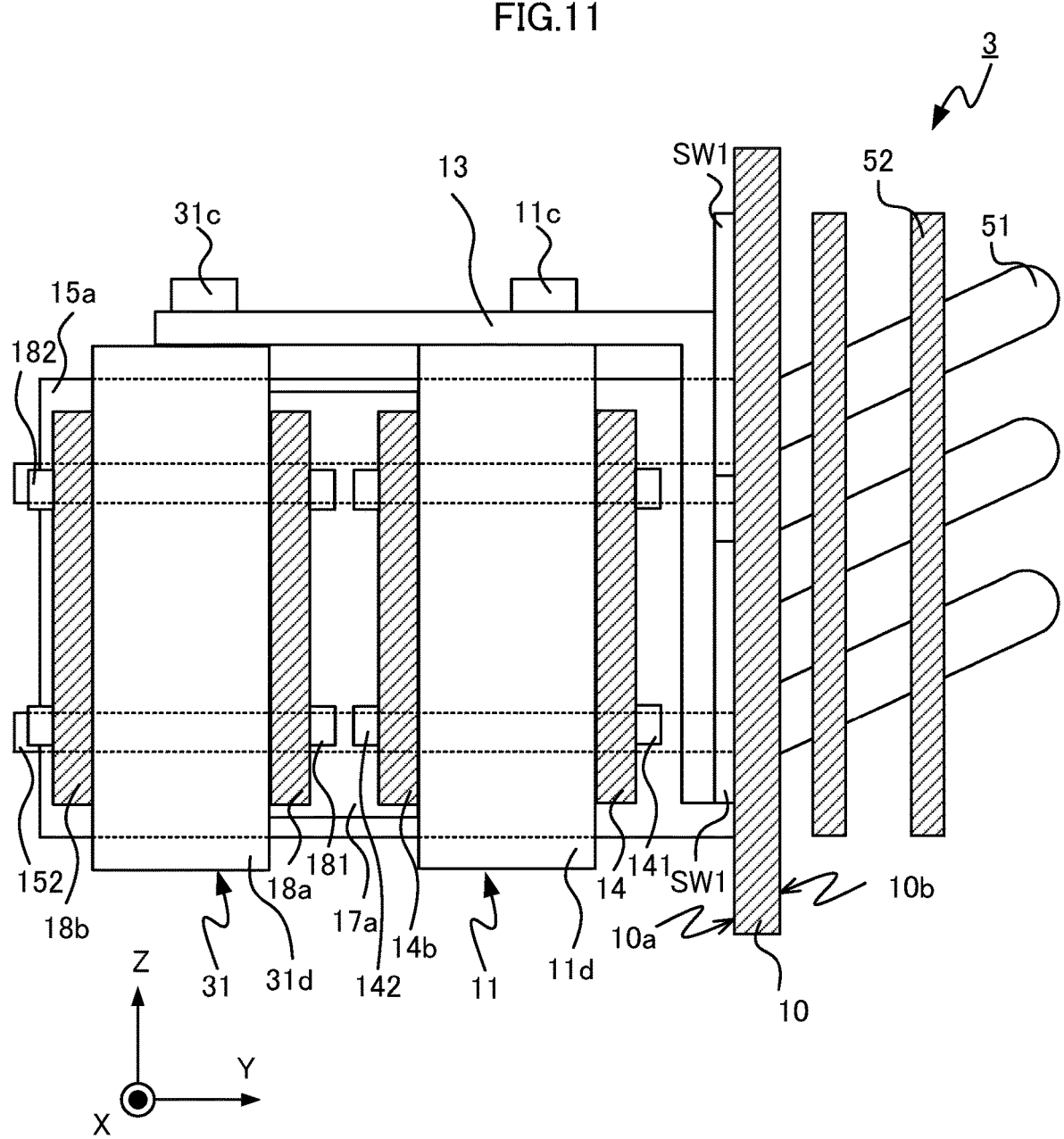
FIG. 11 is a cross-sectional view of the power conversion apparatus according to Embodiment 3 taken along the line C-C of FIG. 9.

A structure of the power conversion apparatus 3 according to Embodiment 3 for fixing the capacitor units 11, 21, 31, and 41 to the base 10 is described below with reference to FIGS. 9 to 11, mainly focusing on the differences from Embodiment 2. FIGS. 9 and 10 are top views of the power conversion apparatus 3, and FIG. 11 is a cross-sectional view taken along the line C-C of FIG. 9. FIGS. 9 to 11 do not illustrate the contactor MC1 or MC2 or the components of the power converters 12 and 22 other than the switching elements SW1 and SW2, in order to simplify the figure. FIG. 10 is formed by removing the bus bars 13 and 23 from the top view of the power conversion apparatus 3 in FIG. 9.

At least one coupling member in the power conversion apparatus 3 includes the pair of first coupling members 14a and 14b and another pair of first coupling members 18a and 18b that extend in the X-axis and Z-axis directions and face each other with a space therebetween in the direction intersecting the main surface 10a of the base 10. The power conversion apparatus 3 is not equipped with the second coupling member 16a or 16b.

The pair of first coupling members 14a and 14b extend in the X-axis and Z-axis directions and face each other with a space therebetween in the Y-axis direction. The pair of first coupling members 14a and 14b are fixed to the housing 11d of the capacitor unit 11 and the housing 21d of the capacitor unit 21 by the fasteners 141 and 142, while retaining the capacitor units 11 and 21 between the first coupling members 14a and 14b in the Y-axis direction.

In detail, the first coupling member 14a is fixed to the housings 11d and 21d by the four fasteners 141, while being in contact with the respective surfaces of the housings 11d and 21d that face the main surface 10a. The first coupling member 14b is fixed to the housings 11d and 21d by the four fasteners 142, while being in contact with the respective surfaces of the housings 11d and 21d opposite to the surfaces that face the main surface 10a. The pair of first coupling members 14a and 14b press the housings 11d and 21d in the Y-axis direction.

The first coupling members 14a and 14b are not fixed to the main surface 10a.

The pair of first coupling members 18a and 18b extend in the X-axis and Z-axis directions and face each other with a space therebetween in the Y-axis direction. The pair of first coupling members 18a and 18b are fixed to the housing 31d of the capacitor unit 31 and the housing 41d of the capacitor unit 41 by fasteners 181 and 182, while retaining the capacitor units 31 and 41 between the first coupling members 18a and 18b in the Y-axis direction.

In detail, the first coupling member 18a is fixed to the housings 31d and 41d by the four fasteners 181, while being in contact with the respective surfaces of the housings 31d and 41d that face the main surface 10a. The first coupling member 18b is fixed to the housings 31d and 41d by the four fasteners 182, while being in contact with the respective surfaces of the housings 31d and 41d opposite to the surfaces that face the main surface 10a. The pair of first coupling members 18a and 18b press the housings 31d and 41d in the Y-axis direction.

The first coupling members 18a and 18b are not fixed to the main surface 10a.

Each of the first coupling members 14a, 14b, 18a, and 18b is made of a plate member. The first coupling members 14a, 14b, 18a, and 18b and the fitting members 15a and 15b are made of members having sufficient rigidity and strength to at least maintain the positions of the capacitor units 11, 21, 31, and 41 regardless of the maximum expected vibration of the railway vehicle.

As described above, the capacitor units 11, 21, 31, and 41 are fixed to the base 10 by the fitting members 15a and 15b in the power conversion apparatus 3 according to Embodiment 3. Furthermore, the pair of first coupling members 14a and 14b are fixed to the capacitor units 11 and 21, and the pair of first coupling members 18a and 18b are fixed to the capacitor units 31 and 41. The capacitor units 11, 21, 31, and 41 are therefore fixed without displacement, regardless of the maximum expected vibration of the railway vehicle.

The pair of first coupling members 14a and 14b and the pair of first coupling members 18a and 18b are not fixed to the main surface 10a of the base 10. This structure can ensure a larger space for accommodating the components of the power conversion apparatus 3, in comparison to the structure in which fitting frames provided to both ends of each of the capacitor units 11, 21, 31, and 41 in the X-axis direction are fixed to the base. Specifically, arrangement of the switching elements SW1 and SW2 on the main surface 10a of the base 10 is less limited in the power conversion apparatus 3. This advantage allows the switching elements SW1 and SW2 to be placed closer to each other, leading to a reduction in the size of the power conversion apparatus 3.

Embodiment 4

Embodiment 4 is directed to another exemplary structure of the power conversion apparatus 2 for fixing the capacitor units 11, 21, 31, and 41 to the base 10.

Figure 12:
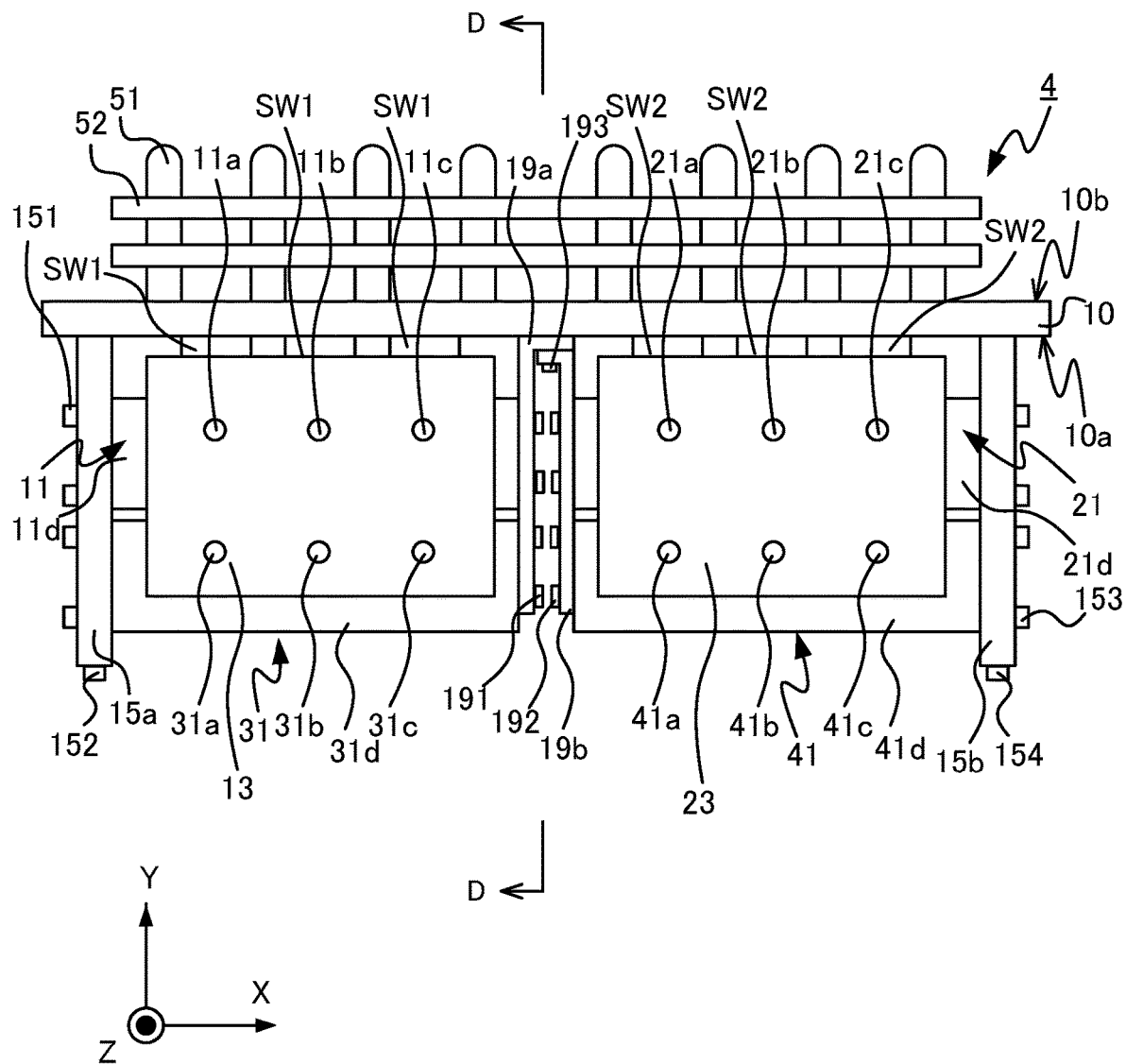
FIG. 12 is a top view of a power conversion apparatus according to Embodiment 4 of the present disclosure.
Figure 13:
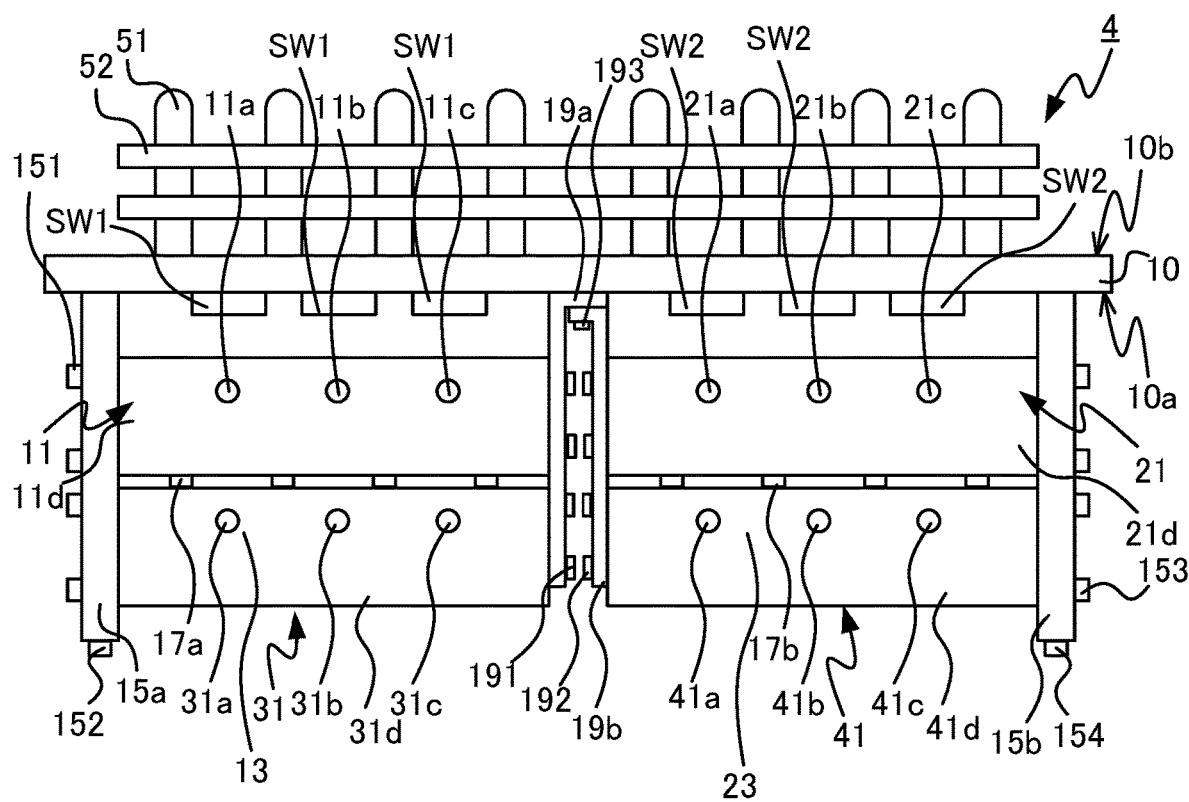
FIG. 13 is a top view of the power conversion apparatus according to Embodiment 4.
Figure 14:
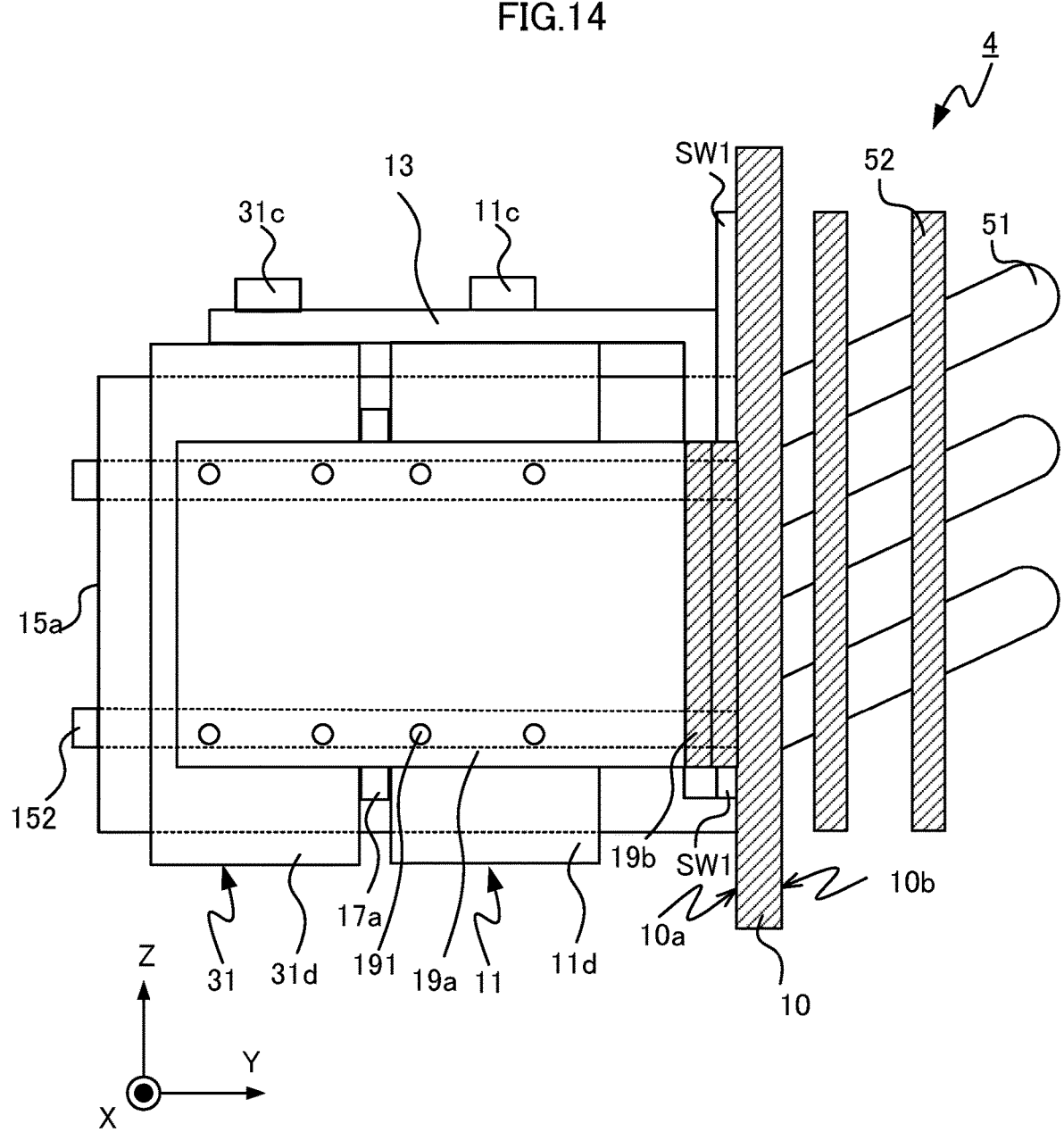
FIG. 14 is a cross-sectional view of the power conversion apparatus according to Embodiment 4 taken along the line D-D of FIG. 12.

A structure of a power conversion apparatus 4 for fixing the capacitor units 11, 21, 31, and 41 to the base 10 is described below with reference to FIGS. 12 to 14, mainly focusing on the differences from Embodiment 2. FIGS. 12 and 13 are top views of the power conversion apparatus 4, and FIG. 14 is a cross-sectional view taken along the line D-D of FIG. 12. FIGS. 12 to 14 do not illustrate the contactor MC1 or MC2 or the components of the power converters 12 and 22 other than the switching elements SW1 and SW2, in order to simplify the figure. FIG. 13 is formed by removing the bus bars 13 and 23 from the top view of the power conversion apparatus 4 in FIG. 12.

At least one coupling member in the power conversion apparatus 4 includes a plurality of second coupling members 19a and 19b extending in a direction intersecting the main surface 10a of the base 10. The power conversion apparatus 4 includes none of the first coupling members 14a, 14b, 18a, and 18b.

Each of the second coupling members 19a and 19b extends in the Y-axis and Z-axis directions. The second coupling member 19a is fixed to the housing 11d of the capacitor unit 11 and the housing 31d of the capacitor unit 31 by fasteners 191. In detail, the second coupling member 19a is fixed to the housings 11d and 31d by the eight fasteners 191, while being in contact with the respective surfaces of the housings 11d and 31d opposite to the surfaces that face the fitting member 15a. The second coupling member 19a presses the housings 11d and 31d toward the fitting member 15a. The second coupling member 19a has an end having a bent shape on the positive side in the Y-axis direction, and this end is fixed to the main surface 10a of the base 10. In detail, the second coupling member 19a is fixed to the main surface 10a by two fasteners 193, such that the end is in contact with the main surface 10a.

The second coupling member 19b is fixed to the housing 21d of the capacitor unit 21 and the housing 41d of the capacitor unit 41 by fasteners 192. In detail, the second coupling member 19b is fixed to the housings 21d and 41d by the eight fasteners 192, while being in contact with the respective surfaces of the housings 21d and 41d opposite to the surfaces that face the fitting member 15b. The second coupling member 19b presses the housings 21d and 41d toward the fitting member 15b. The second coupling member 19b has an end having a bent shape on the positive side in the Y-axis direction, and this end is fixed to the second coupling member 19a. In detail, the second coupling member 19b is fixed to the second coupling member 19a by the two fasteners 193, such that the end is in contact with the second coupling member 19a. Since the second coupling member 19b is fixed to the second coupling member 19a fixed to the main surface 10a, the second coupling member 19b is fixed to the main surface 10a.

Each of the second coupling members 19a and 19b is made of a plate member having a bent end. The fitting members 15a and 15b and the second coupling members 19a and 19b are made of members having sufficient rigidity and strength to at least maintain the positions of the capacitor units 11, 21, 31, and 41, regardless of the maximum expected vibration of the railway vehicle.

As described above, the capacitor units 11, 21, 31, and 41 are fixed to the base 10 by the fitting members 15a and 15b, in the power conversion apparatus 4 according to Embodiment 4. Furthermore, the second coupling members 19a and 19b are fixed to the capacitor units 11, 21, 31, and 41. The capacitor units 11, 21, 31, and 41 are therefore fixed without displacement, regardless of the maximum expected vibration of the railway vehicle.

Embodiment 5

In Embodiments 1 to 4, the fitting member 15a is fixed to the housings 11d and 31d while being in contact with the housings 11d and 31d. Instead, the fitting member 15a may be fixed to the housings 11d and 31d without contact with the housings 11d and 31d. The same holds true for the fitting member 15b and the second coupling members 16a and 16b. Embodiment 5 is directed to an exemplary structure in which the fitting member 15a is not in contact with the housings 11d and 31d, the fitting member 15b is not in contact with the housings 21d and 41d, the second coupling member 16a is not in contact with the housings 11d and 31d, and the second coupling member 16b is not in contact with the housings 21d and 41d.

Figure 15:
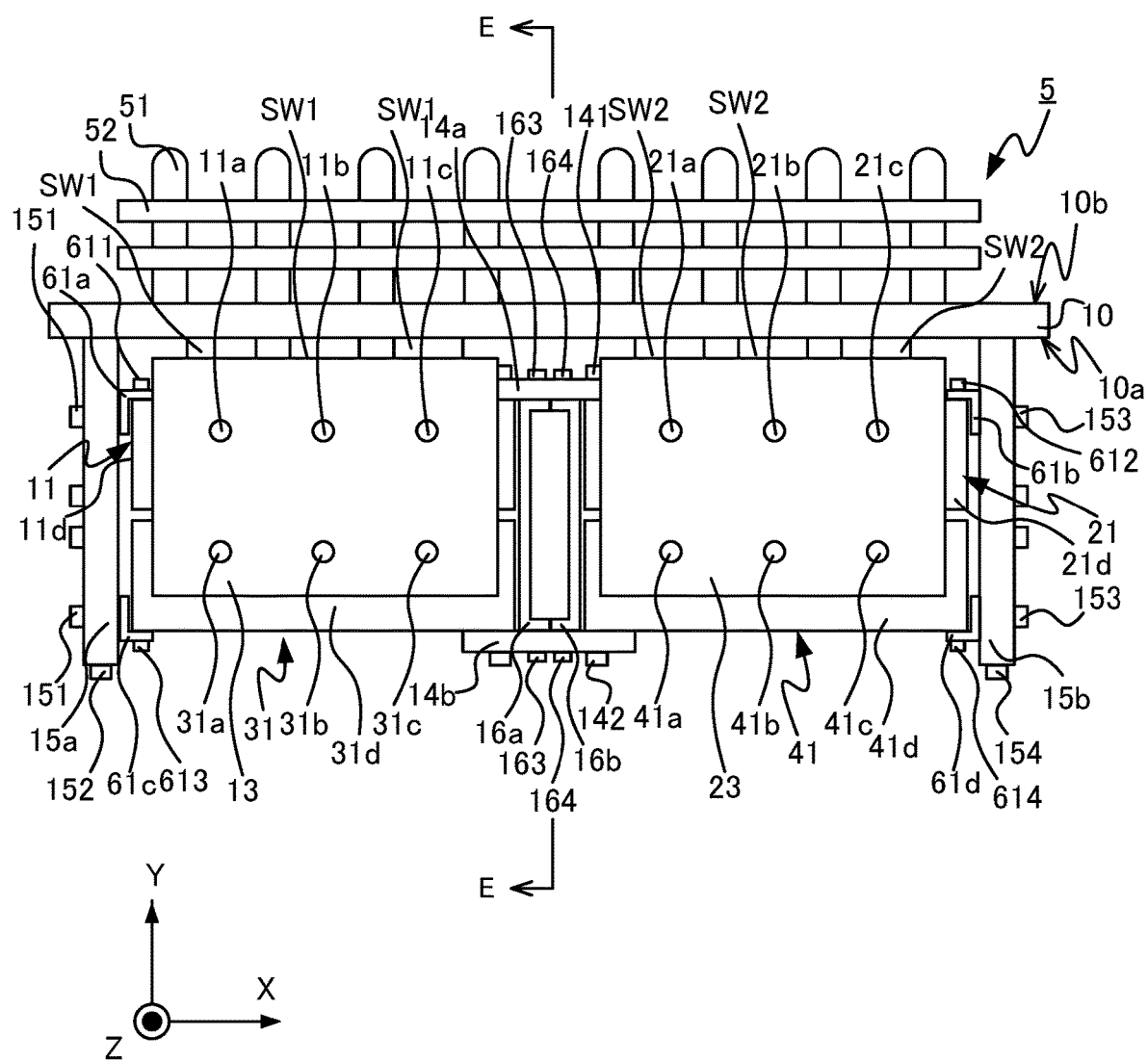
FIG. 15 is a top view of a power conversion apparatus according to Embodiment 5 of the present disclosure.
Figure 16:
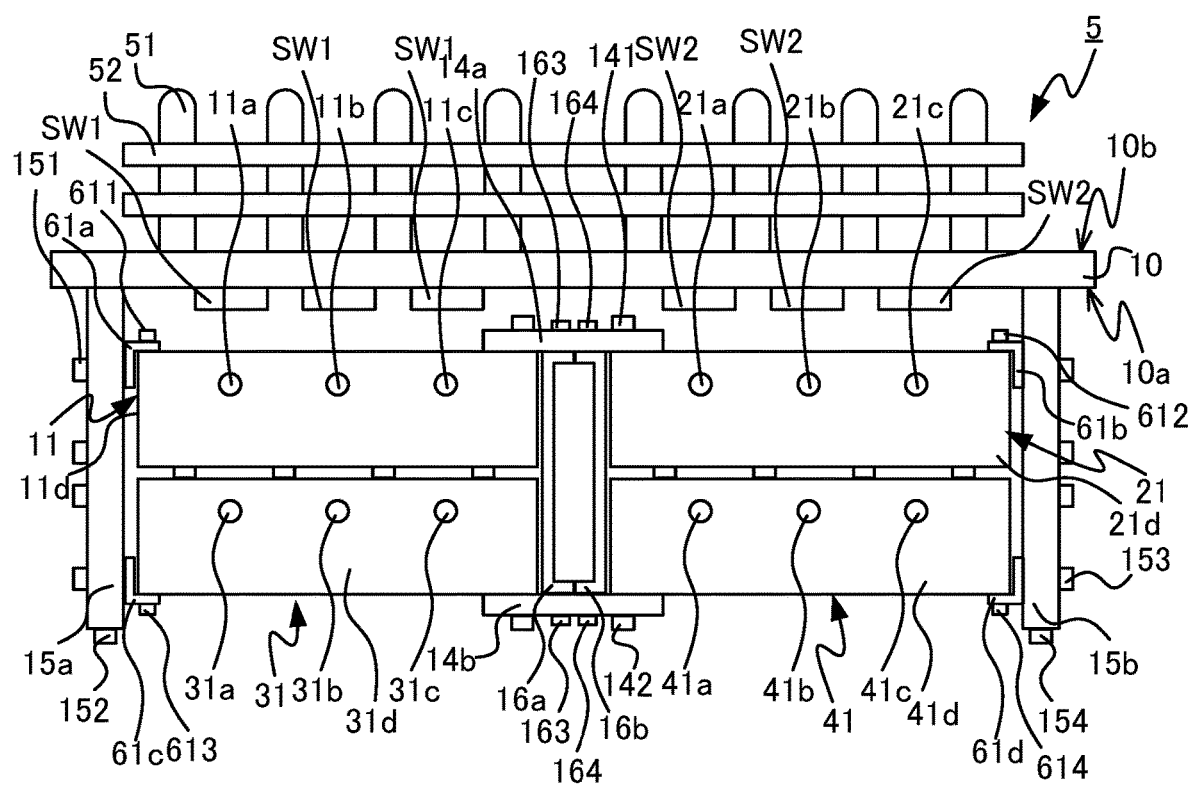
FIG. 16 is a top view of the power conversion apparatus according to Embodiment 5.
Figure 16:
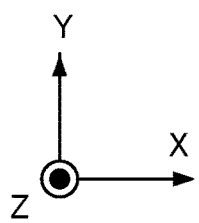
Figure 17:
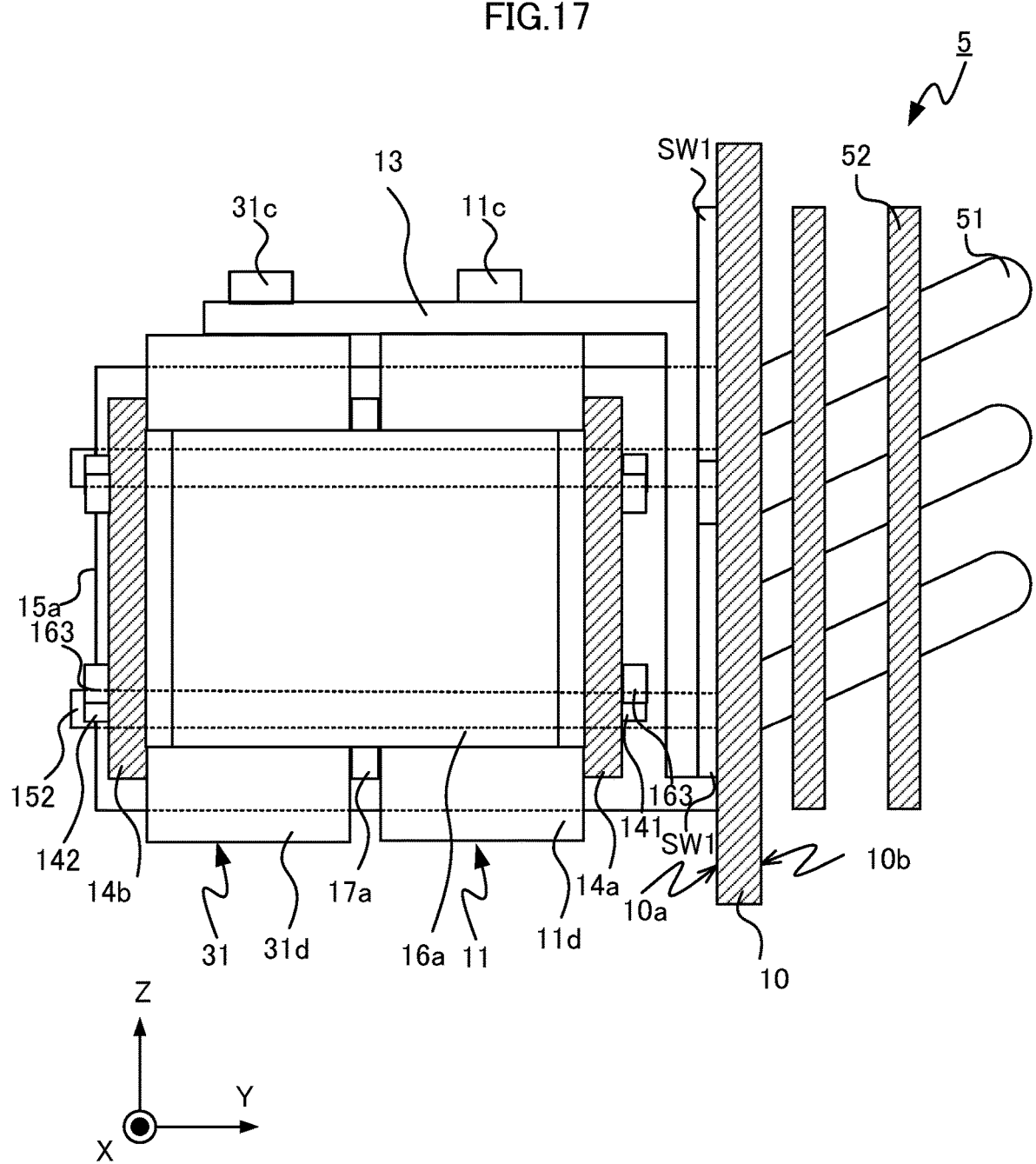
FIG. 17 is a cross-sectional view of the power conversion apparatus according to Embodiment 5 taken along the line E-E of FIG. 15.

A structure of the power conversion apparatus 5 according to Embodiment 5 for fixing the capacitor units 11, 21, 31, and 41 to the base 10 is described below with reference to FIGS. 15 to 17, mainly focusing on the differences from Embodiment 2. FIGS. 15 and 16 are top views of the power conversion apparatus 5, and FIG. 17 is a cross-sectional view taken along the line E-E of FIG. 15. FIGS. 15 to 17 do not illustrate the contactor MC1 or MC2 or the components of the power converters 12 and 22 other than the switching elements SW1 and SW2, in order to simplify the figure. FIG. 16 is formed by removing the bus bars 13 and 23 from the top view of the power conversion apparatus 5 in FIG. 15.

At least one coupling member in the power conversion apparatus 5 includes the pair of first coupling members 14a and 14b that extend in the X-axis and Z-axis directions and face each other with a space therebetween in the direction intersecting the main surface 10a of the base 10, and the plurality of second coupling members 16a and 16b extending in the direction intersecting the main surface 10a of the base 10. The power conversion apparatus 5 is further equipped with a fixing member 61a fixed to the fitting member 15a and the housing 11d, a fixing member 61b fixed to the fitting member 15b and the housing 21d, a fixing member 61c fixed to the fitting member 15a and the housing 31d, and a fixing member 61d fixed to the fitting member 15b and the housing 41d.

Specifically, the fixing member 61a is fixed to the fitting member 15a by the two fasteners 151, while being in contact with the fitting member 15a. The fixing member 61a is also fixed to the housing 11d by two fasteners 611, while being in contact with the housing 11d.

The fixing member 61b is fixed to the fitting member 15b by the two fasteners 153, while being in contact with the fitting member 15b. The fixing member 61b is also fixed to the housing 21d by two fasteners 612, while being in contact with the housing 21d.

The fixing member 61c is fixed to the fitting member 15a by the two fasteners 151, while being in contact with the fitting member 15a. The fixing member 61c is also fixed to the housing 31d by two fasteners 613, while being in contact with the housing 31d.

The fixing member 61d is fixed to the fitting member 15b by the two fasteners 153, while being in contact with the fitting member 15b. The fixing member 61d is also fixed to the housing 41d by two fasteners 614, while being in contact with the housing 41d.

Each of the second coupling members 16a and 16b extends in the Y-axis and Z-axis directions. The second coupling member 16a has ends having a bent shape in the Y-axis direction. One of the ends is fixed to the first coupling member 14a, and the other end is fixed to the first coupling member 14b. Specifically, one end of the second coupling member 16a in the Y-axis direction is fixed to the first coupling member 14a by two fasteners 163, while being in contact with the first coupling member 14a. The other end of the second coupling member 16a in the Y-axis direction is fixed to the first coupling member 14b by the two fasteners 163, while being in contact with the first coupling member 14b.

The second coupling member 16b has ends having a bent shape in the Y-axis direction. One of the ends is fixed to the first coupling member 14a, and the other end is fixed to the first coupling member 14b. Specifically, one end of the second coupling member 16b in the Y-axis direction is fixed to the first coupling member 14a by two fasteners 164, while being in contact with the first coupling member 14a. The other end of the second coupling member 16b in the Y-axis direction is fixed to the first coupling member 14b by the two fasteners 164, while being in contact with the first coupling member 14b.

As described above, the capacitor units 11, 21, 31, and 41 are fixed to the base 10 by the fixing members 61a, 61b, 61c, and 61d and the fitting members 15a and 15b, in the power conversion apparatus 5 according to Embodiment 5. Furthermore, the first coupling members 14a and 14b are fixed to the capacitor units 11, 21, 31, and 41, and the second coupling members 16a and 16b are fixed to the first coupling members 14a and 14b. The capacitor units 11, 21, 31, and 41 are therefore fixed without displacement, regardless of the maximum expected vibration of the railway vehicle.

The above-described embodiments are not to be construed as limiting the present disclosure. Any two or more of the above-described embodiments may be combined. For example, the power conversion apparatus 1 may be equipped with the fixing members 61a, 61b, 61c, and 61d, and the fasteners 611, 612, 613, and 614.

The number of capacitor units is any natural number equal to or higher than two. The power conversion apparatuses 2 to 5 may be equipped with six capacitor units arranged in two rows in the X-axis direction and three columns in the Y-axis direction, for example.

Alternatively, the power conversion apparatuses 2 to 5 may be equipped with six capacitor units arranged in three rows in the X-axis direction and two columns in the Y-axis direction. In this case, the fitting members 15a and 15b are fixed to each of the capacitor units located on both sides in the X-axis direction.

The above-mentioned directions of arrangement of the capacitor units are mere examples. The power conversion apparatus 1 may be equipped with the capacitor units 11 and 21 adjacent to each other in the Z-axis direction, for example.

The power conversion apparatus 1 may be equipped with an adhesive for bonding the first coupling member 14a to the housings 11d and 21d, instead of the fasteners 141. Also, the power conversion apparatus 1 may be equipped with an adhesive for bonding the first coupling member 14b to the housings 11d and 21d, instead of the fasteners 142.

The power conversion apparatuses 1 to 5 do not necessarily include a three-level inverter of a dual system and may be any power conversion apparatus equipped with a plurality of capacitor units and a plurality of switching elements. For example, the power conversion apparatuses 1 to 5 may be a power conversion apparatus fed with AC power from an AC power source.

The power conversion apparatuses 1 to 5 may be installed in any environment that receives vibration, as well as a railway vehicle.

The fitting members 15a and 15b may also be made of a column member instead of a plate member. The first coupling members 14a, 14b, 18a, and 18b and the second coupling members 16a, 16b, 19a, and 19b may also be made of a column member instead of a plate member.

The number and shape of the spacers 17a and 17b may be arbitrarily modified provided that the spacers 17a and 17b can ensure the space between the housings 11d and 31d and the space between the housings 21d and 41d.

The power conversion apparatuses 2 to 5 may exclude the spacers 17a or 17b. In this case, the housing 11d may be in contact with the housing 31d, and the housing 21d may be in contact with the housing 41d.

The number and positions of the fasteners 141, 142, 151, 152, 161, 162, 163, 164, 181, 182, 191, 192, 193, 611, 612, 613, and 614 may be arbitrarily modified provided that the structure can fix the capacitor units 11, 21, 31, and 41 without displacement, regardless of the maximum expected vibration of the railway vehicle.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5 Power conversion apparatus
9 Load
10 Cooler base
10a, 10b Main surface
11, 21, 31, 41 Capacitor unit
11a, 11b, 11c, 21a, 21b, 21c, 31a, 31b, 31c, 41a, 41b, 41c Output terminal
11d, 21d, 31d, 41d Housing
12, 22 Power converter
12a, 22a Positive-electrode terminal
12b, 22b Middle terminal
12c, 22c Negative-electrode terminal
13, 23 Bus bar
14a, 14b, 18a, 18b First coupling member
15a, 15b Fitting member
16a, 16b, 19a, 19b Second coupling member
17a, 17b Spacer
51 Heat pipe
52 Fin
61a, 61b, 61c, 61d Fixing member
141, 142, 151, 152, 153, 154, 161, 162, 163, 164, 181, 182, 191, 192, 193, 611, 612, 613, 614 Fastener
FC11, FC12, FC21, FC22 Filter capacitor
MC1, MC2 Contactor
SW1, SW2 Switching element

The invention claimed is:

1. A power conversion apparatus comprising:
a plurality of capacitor units each comprising at least one capacitor charged with electric power fed from a power source;
a plurality of power converters each comprising primary terminals, secondary terminals, and switching elements, the primary terminals of the power converter being connected to a corresponding capacitor unit among the capacitor units, the power converter being configured to convert electric power fed via the primary terminals into electric power to be fed to a load connected to the secondary terminals by means of switching between on and off states of the switching elements and feed the converted electric power via the secondary terminals to the load;
a base having a main surface to which the switching elements of each of the power converters are fixed;

at least one coupling member fixed to some of the capacitor units adjacent to each other; and a plurality of fitting members each fixed to a corresponding capacitor unit among the capacitor units and fixed to the base, wherein the capacitor units are disposed along the main surface of the base, the fitting members are fixed to capacitor units located on both sides among the capacitor units disposed along the main surface, and the at least one coupling member comprises at least one pair of first coupling members extending along the main surface of the base and facing each other with a space therebetween in a direction intersecting the main surface of the base.

2. The power conversion apparatus according to claim 1, wherein the at least one pair of first coupling members are fixed to some of the capacitor units adjacent to each other in a direction along the main surface of the base.

3. The power conversion apparatus according to claim 2, further comprising:

a fixing member fixed to the at least one pair of first coupling members and extending in the direction intersecting the main surface of the base.

4. The power conversion apparatus according to claim 3, wherein the capacitor units are disposed in a two-dimensional manner in a direction along the main surface of the base and a direction intersecting the main surface of the base.

5. The power conversion apparatus according to claim 4, further comprising:

a spacer in contact with some of the capacitor units adjacent to each other in the direction intersecting the main surface of the base.

6. The power conversion apparatus according to claim 2, wherein the capacitor units are disposed in a two-dimensional manner in a direction along the main surface of the base and a direction intersecting the main surface of the base.

7. The power conversion apparatus according to claim 6, further comprising:

a spacer in contact with some of the capacitor units adjacent to each other in the direction intersecting the main surface of the base.

8. The power conversion apparatus according to claim 1, wherein the capacitor units are disposed in a two-dimensional manner in a direction along the main surface of the base and a direction intersecting the main surface of the base.

9. The power conversion apparatus according to claim 8, further comprising:

a spacer in contact with some of the capacitor units adjacent to each other in the direction intersecting the main surface of the base.

10. The power conversion apparatus according to claim 1, further comprising:

fasteners to fix the at least one coupling member to some of the capacitor units.

11. The power conversion apparatus according to claim 1, further comprising:

an adhesive to bond the at least one coupling member to some of the capacitor units.

12. A power conversion apparatus comprising:

a plurality of capacitor units each comprising at least one capacitor charged with electric power fed from a power source;

a plurality of power converters each comprising primary terminals, secondary terminals, and switching elements, the primary terminals of the power converter being connected to a corresponding capacitor unit among the capacitor units, the power converter being configured to convert electric power fed via the primary terminals into electric power to be fed to a load connected to the secondary terminals by means of switching between on and off states of the switching elements and feed the converted electric power via the secondary terminals to the load;

a base having a main surface to which the switching elements of each of the power converters are fixed;

at least one coupling member fixed to some of the capacitor units adjacent to each other; and a plurality of fitting members each fixed to a corresponding capacitor unit among the capacitor units and fixed to the base, wherein the capacitor units are disposed in a two-dimensional manner in a direction along the main surface of the base and a direction intersecting the main surface of the base, the fitting members are fixed to capacitor units located on both sides among the capacitor units disposed along the main surface, the at least one coupling member comprises:
  at least one pair of first coupling members extending along the main surface of the base and facing each other with a space therebetween in the direction intersecting the main surface of the base; and
  a plurality of second coupling members extending in the direction intersecting the main surface of the base, the at least one pair of first coupling members are fixed to some of the capacitor units adjacent to each other in the direction along the main surface of the base, and the second coupling members are each fixed to some of the capacitor units adjacent to each other in the direction intersecting the main surface of the base.

13. The power conversion apparatus according to claim 12, further comprising:

a spacer in contact with some of the capacitor units adjacent to each other in the direction intersecting the main surface of the base.

14. The power conversion apparatus according to claim 12, further comprising:

fasteners to fix the at least one coupling member to some of the capacitor units.

15. The power conversion apparatus according to claim 12, further comprising:

an adhesive to bond the at least one coupling member to some of the capacitor units.

16. A power conversion apparatus comprising:

a plurality of capacitor units each comprising at least one capacitor charged with electric power fed from a power source;

a plurality of power converters each comprising primary terminals, secondary terminals, and switching elements, the primary terminals of the power converter being connected to a corresponding capacitor unit among the capacitor units, the power converter being configured to convert electric power fed via the primary terminals into electric power to be fed to a load connected to the secondary terminals by means of switching between on and off states of the switching elements and feed the converted electric power via the secondary terminals to the load;

a base having a main surface to which the switching elements of each of the power converters are fixed;

at least one coupling member fixed to some of the capacitor units adjacent to each other; and a plurality of fitting members each fixed to a corresponding capacitor unit among the capacitor units and fixed to the base, wherein the capacitor units are disposed in a two-dimensional manner in a direction along the main surface of the base and a direction intersecting the main surface of the base, the fitting members are fixed to capacitor units located on both sides among the capacitor units disposed along the main surface, the at least one coupling member comprises a plurality of second coupling members extending in the direction intersecting the main surface of the base, the second coupling members are each fixed to some of the capacitor units adjacent to each other in the direction intersecting the main surface of the base, and at least one of the second coupling members is fixed to the base, and another of the second coupling members is fixed to the at least one of the second coupling members fixed to the base.

17. The power conversion apparatus according to claim 16, further comprising:

a spacer in contact with some of the capacitor units adjacent to each other in the direction intersecting the main surface of the base.

18. The power conversion apparatus according to claim 16, further comprising:

fasteners to fix the at least one coupling member to some of the capacitor units.

19. The power conversion apparatus according to claim 16, further comprising:

an adhesive to bond the at least one coupling member to some of the capacitor units.

* * * * *